US008831369B2

(12) United States Patent
Uemori et al.

(10) Patent No.: US 8,831,369 B2
(45) Date of Patent: Sep. 9, 2014

(54) IMAGE PROCESSING APPARATUS AND IMAGE PROCESSING METHOD

(75) Inventors: Takeshi Uemori, Tokyo (JP); Ohji Nakagami, Tokyo (JP); Masahito Yamane, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 13/219,849

(22) Filed: Aug. 29, 2011

(65) Prior Publication Data

US 2012/0057777 A1    Mar. 8, 2012

(30) Foreign Application Priority Data

Sep. 3, 2010  (JP) ................................ 2010-198118
Jan. 27, 2011 (JP) ................................ 2011-014940

(51) Int. Cl.
*G06K 9/36* (2006.01)
*G06K 9/46* (2006.01)
*H04N 7/26* (2006.01)
*H04N 7/30* (2006.01)

(52) U.S. Cl.
CPC ... *H04N 19/00236* (2013.01); *H04N 19/00472* (2013.01); *H04N 19/00266* (2013.01); *H04N 19/00133* (2013.01); *H04N 19/00436* (2013.01); *H04N 19/00545* (2013.01); *H04N 19/00127* (2013.01); *H04N 19/0009* (2013.01); *H04N 19/00806* (2013.01); *H04N 19/00278* (2013.01); *H04N 19/00812* (2013.01); *H04N 19/00145* (2013.01)
USPC .......................................... 382/248; 382/233

(58) Field of Classification Search
USPC .......... 382/154, 233, 248, 250, 251, 277, 302
See application file for complete search history.

(56) References Cited

U.S. PATENT DOCUMENTS

| 5,126,962 | A | * | 6/1992 | Chiang ......................... 708/401 |
| 5,289,289 | A | * | 2/1994 | Nagasaki ...................... 382/251 |
| 5,327,242 | A | * | 7/1994 | Naimpally et al. ........... 348/606 |

(Continued)

FOREIGN PATENT DOCUMENTS

| JP | 63-292769 A | 11/1988 |
| JP | 03-080676 A | 4/1991 |

(Continued)

OTHER PUBLICATIONS

Chan, Raymond K.W. et al., "3D-DCT Quantization as a Compression Technique for Video Sequences", IEEE, International Conference Sep. 1997, pp. 188-196, The Chinese University of Hong Kong, Hong Kong.

(Continued)

*Primary Examiner* — Phuoc Tran
(74) *Attorney, Agent, or Firm* — Wolf, Greenfield & Sacks, P.C.

(57) ABSTRACT

An image processing apparatus includes a two-dimensional orthogonal transform unit configured to perform two-dimensional orthogonal transform on a plurality of images, an one-dimensional orthogonal transform unit configured to perform one-dimensional orthogonal transform in a direction in which the images are arranged on two-dimensional orthogonal transform coefficient data obtained by performing the two-dimensional orthogonal transform on the images using the two-dimensional orthogonal transform unit, and a three-dimensional orthogonal transform coefficient data encoder configured to encode three-dimensional orthogonal transform coefficient data obtained by performing the one-dimensional orthogonal transform on the two-dimensional orthogonal transform coefficient data using the one-dimensional orthogonal transform unit.

20 Claims, 27 Drawing Sheets

(56) References Cited

U.S. PATENT DOCUMENTS

| | | |
|---|---|---|
| 5,355,167 A | 10/1994 | Juri |
| 5,369,439 A | 11/1994 | Matsuda et al. |
| 5,442,399 A | 8/1995 | Asamura et al. |
| 5,485,533 A | 1/1996 | Hatano et al. |
| 5,933,193 A * | 8/1999 | Niesen .............. 375/240.12 |
| 5,959,672 A | 9/1999 | Sasaki |
| 6,185,312 B1 | 2/2001 | Nakamura et al. |
| 6,633,676 B1 | 10/2003 | Kleihorst et al. |
| 8,310,531 B2 | 11/2012 | Nandy |
| 2005/0100245 A1 | 5/2005 | Chen et al. |
| 2006/0062308 A1 * | 3/2006 | Staelin et al. ............ 375/240.18 |
| 2007/0098068 A1 | 5/2007 | Kimata et al. |
| 2007/0183072 A1 | 8/2007 | Lee |
| 2007/0291847 A1 | 12/2007 | Shimauchi et al. |
| 2008/0069469 A1 | 3/2008 | Yan et al. |
| 2008/0165848 A1 | 7/2008 | Ye et al. |
| 2008/0260043 A1 | 10/2008 | Bottreau et al. |
| 2009/0010568 A1 | 1/2009 | Nakagami et al. |
| 2009/0074061 A1 | 3/2009 | Yin et al. |
| 2009/0080535 A1 | 3/2009 | Yin et al. |
| 2009/0116760 A1 | 5/2009 | Boon et al. |
| 2009/0252425 A1 | 10/2009 | Bruls et al. |
| 2009/0262803 A1 | 10/2009 | Wang et al. |
| 2010/0118963 A1 | 5/2010 | Nakagami et al. |
| 2010/0183072 A1 | 7/2010 | Nakagami et al. |
| 2011/0142356 A1 | 6/2011 | Uemori et al. |
| 2011/0175993 A1 | 7/2011 | Uemori et al. |
| 2012/0057777 A1 | 3/2012 | Uemori et al. |
| 2012/0251014 A1 | 10/2012 | Watanabe et al. |
| 2013/0120550 A1 | 5/2013 | Chen et al. |
| 2013/0242219 A1 | 9/2013 | Yun et al. |

FOREIGN PATENT DOCUMENTS

| | | |
|---|---|---|
| JP | 09-284760 A | 10/1997 |
| JP | 11-046361 A | 2/1999 |
| JP | 2000-316120 A | 11/2000 |
| JP | 2005-533320 A | 11/2005 |
| JP | 2006-197074 A | 7/2006 |
| JP | 2007-011977 A | 1/2007 |
| JP | 2010-172001 A | 8/2010 |

OTHER PUBLICATIONS

Maor Zeev, et al., "MPEG-2→H.264 Transcoding", Dec. 1, 2004, Technion—Israel Institute of Technology, SIPL H.264 Workshop.

Baskurt et al., 3-Dimensional Image Compression by Discrete Cosine Transform. Signal Processing, Theories and Applications. Proceed Euro Signal Process Conf (EUSIPCO), Sep. 5-8, 1988;1:79-82.

Chan et al., Three-dimensional transform compression of images from dynamic studies. Proceed SPIE, SPIE, 1990;1232:322-6.

Ramaswamy et al., A Mixed Transform Approach for Efficient Compression of Medical Images. IEEE Trans. Medic. Imaging, 1996;15(3): 343.

Roese et al., Interframe Cosine Transform Image Coding. IEEE Transac Commun, 1977;25(11):1329-39.

Urbano et al., 3-Dimensional medical image compression: A first approach to the application of the ADCT-ISO. Engineering in Medic. and Biol. Soc., Proceed. Ann. Intl. Conf. of IEEE, 1992;1219-20.

Irani et al., Improving Resolution by Image Registration. Graphical Models and Image Processing, May 1991, pp. 231-239, vol. 53, No. 3, Academic Press, Inc., Jerusalem, Israel.

* cited by examiner

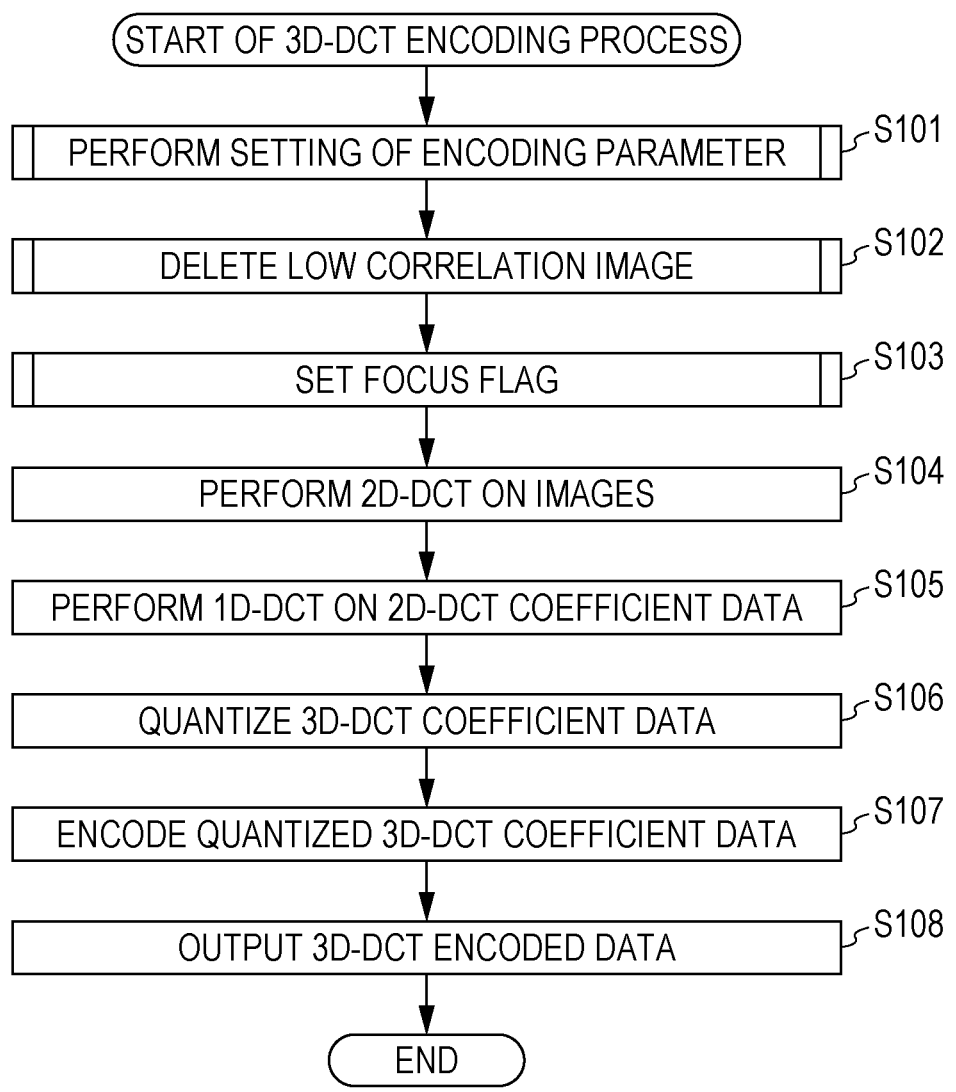

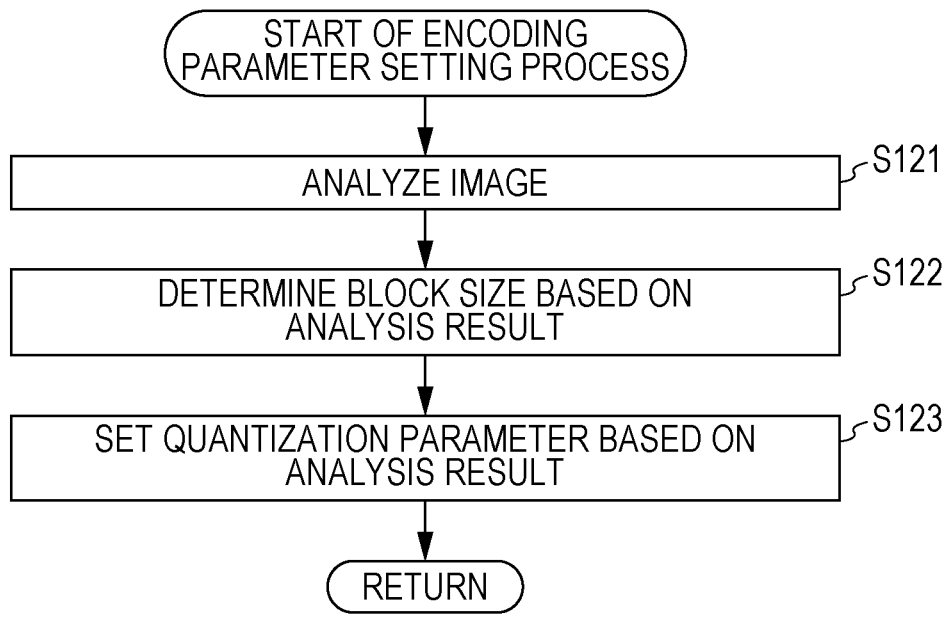
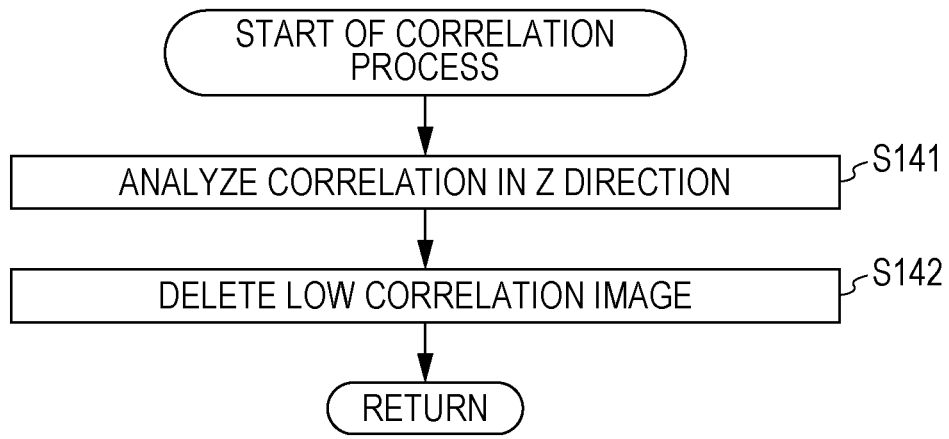

FIG. 18

PIXEL SPACE $A_1 *$ | 1 | 2 |
| --- | --- |
| 3 | 4 |

16 × 16 PIXEL ARRAY $* B_1 =$

8 × 8 PIXEL ARRAY $A_1 = \begin{Bmatrix} 1 & 0 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 & 0 \end{Bmatrix}$ $B_1 = 1$ $B_1 = \begin{Bmatrix} 1 & 0 & 0 & 0 & 0 & 0 & 0 & 0 & 1 & 0 & 0 & 0 & 0 & 0 & 0 & 0 \\ 0 & 1 & 0 & 0 & 0 & 0 & 0 & 0 & 0 & 1 & 0 & 0 & 0 & 0 & 0 & 0 \\ 0 & 0 & 1 & 0 & 0 & 0 & 0 & 0 & 0 & 0 & 1 & 0 & 0 & 0 & 0 & 0 \\ 0 & 0 & 0 & 1 & 0 & 0 & 0 & 0 & 0 & 0 & 0 & 1 & 0 & 0 & 0 & 0 \\ 0 & 0 & 0 & 0 & 1 & 0 & 0 & 0 & 0 & 0 & 0 & 0 & 1 & 0 & 0 & 0 \\ 0 & 0 & 0 & 0 & 0 & 1 & 0 & 0 & 0 & 0 & 0 & 0 & 0 & 1 & 0 & 0 \\ 0 & 0 & 0 & 0 & 0 & 0 & 1 & 0 & 0 & 0 & 0 & 0 & 0 & 0 & 1 & 0 \\ 0 & 0 & 0 & 0 & 0 & 0 & 0 & 1 & 0 & 0 & 0 & 0 & 0 & 0 & 0 & 1 \end{Bmatrix}$

FREQUENCY SPACE $DCT_{16 \times 8} \langle A_1 \rangle * DCT_{16 \times 16} \langle$ | 1 | 2 |
| --- | --- |
| 3 | 4 |

$\rangle * DCT_{8 \times 16} \langle B_1 \rangle = DCT_{8 \times 8} \langle 1 \rangle$

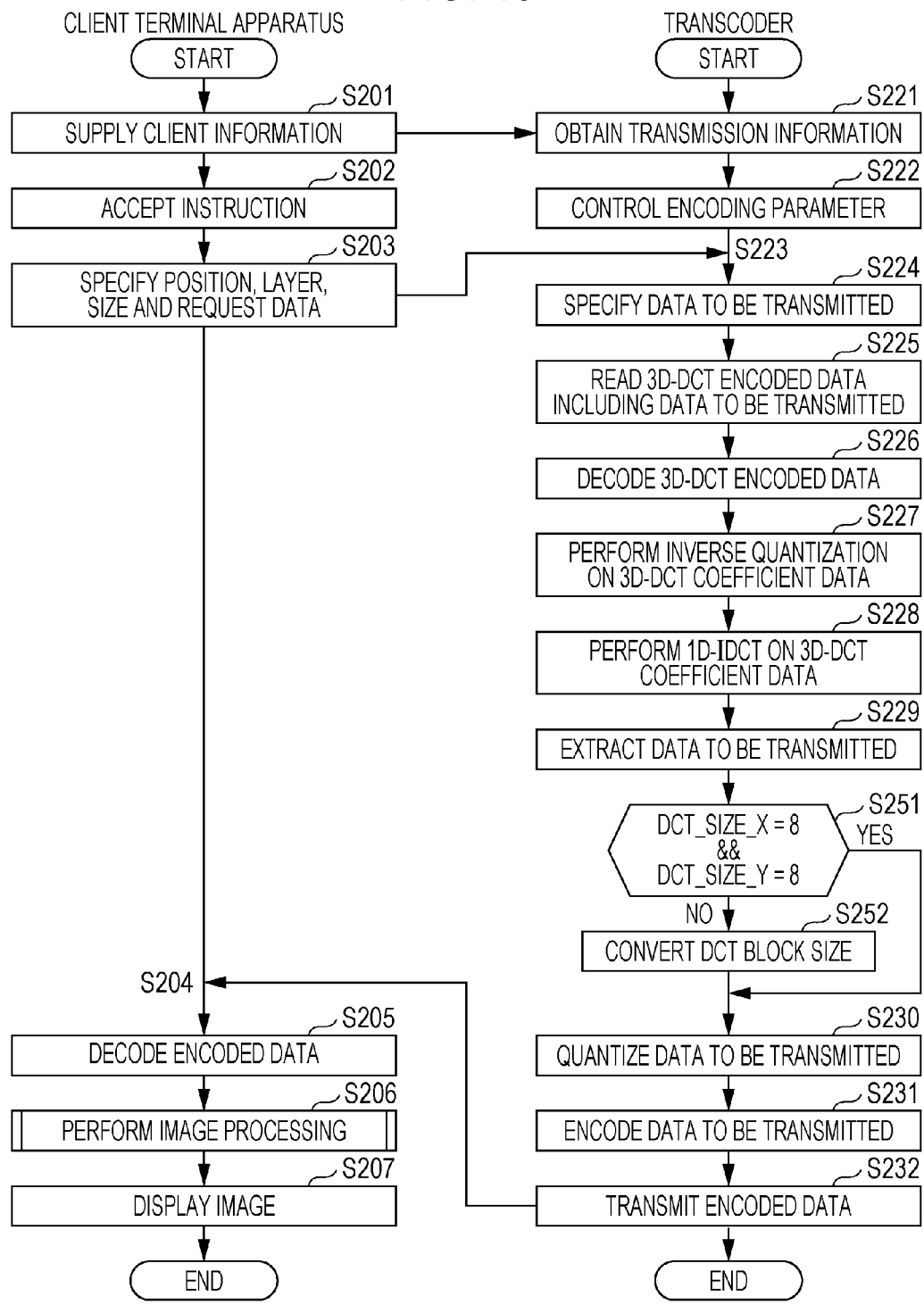

IMAGE PROCESSING APPARATUS AND IMAGE PROCESSING METHOD

BACKGROUND

The present disclosure relates to image processing apparatuses and image processing methods, and particularly relates to an image processing apparatus and an image processing method which are capable of reducing a capacity for storing encoded data obtained by encoding images.

In recent years, in a field of a pathological diagnosis such as so-called cytoscreening and a tissue diagnosis, a digital pathological diagnosis has been performed using a virtual microscope.

The virtual microscope is an apparatus including a microscope device capable of obtaining image data and a computer which processes the image data. The virtual microscope captures an entire slide glass on which a sample (specimen) is placed and stores a microscopic image of the sample as a digital image.

By this, higher-level microscopic observation may be performed by appropriately performing image processing on the microscopic image of the sample and displaying the processed image on a display of a personal computer, for example, when compared with a case where a normal microscope is used for the observation of the specimen. For example, the image processing may be performed on the microscopic image so that the specimen is clearly viewed. Furthermore, a portion of the microscopic image may be enlarged for display, for example. Moreover, microscopic observation through the Internet may be performed.

In general, specimens used in a pathological diagnosis such as cytoscreening and a tissue diagnosis have thicknesses of themselves. Therefore, data of an image (Z-stack image) obtained by capturing such a specimen from a plurality of focus planes should be obtained to obtain a 3D structure of the specimen.

Note that, since a large capacity is used for uncompressed image data, it is difficult to store and manage the uncompressed image data. Therefore, in the Digital Imaging and Communication in Medicine (DICOM) standard, the JPEG (Joint Photographic Experts Group) is employed as a codec format for such digital microscopic image data.

However, also in this case, since a plurality of JPEG data should be obtained for a single specimen, a large capacity is used for storing and managing the data. Accordingly, an amount of data should be reduced.

For example, a compression method for a plurality of focus plane images using interframe encoding in which differences between adjacent frames are obtained has been proposed. Furthermore, a method for determining a focus plane serving as a reference and performing compression using blur compensating prediction utilizing a blur change obtained in accordance with an optical parameter and a Z coordinate displacement from the reference focus plane has been proposed (refer to Japanese Unexamined Patent Application Publication No. 2007-11977).

Here, in a system using the virtual microscope described above, a portion of microscopic image data which has been stored is displayed as an observation image. In this case, a quick response (display) should be performed in response to specifying of a position and a size of the portion to be displayed.

SUMMARY

However, in the method disclosed in Japanese Unexamined Patent Application Publication No. 2007-11977, a load at a time of a decoding process is large, and accordingly, it may be difficult to realize high-speed response. For example, when encoded data is supplied from a server which stores the encoded data without change to a terminal apparatus which displays an image (and which demanded the image) and is decoded by the terminal apparatus to obtain a decoded image to be displayed in the terminal apparatus, a load applied to the terminal apparatus which has lower processing capability may be increased, and accordingly, response may become slow. Furthermore, the terminal apparatus should be compatible with the encoding method disclosed in Japanese Unexamined Patent Application Publication No. 2007-11977, and accordingly, general versatility may be lowered.

Furthermore, for example, when the encoded data is decoded by the server and thereafter an image is transmitted to the terminal apparatus, an amount of data to be transmitted is increased. Therefore, response may become slow due to transmission delay and the like.

Accordingly, it is desirable to reduce capacity used for storing encoded data obtained by encoding an image while deterioration of usability of the image is suppressed.

According to an embodiment of the present disclosure, there is provided an image processing apparatus including a two-dimensional orthogonal transform unit configured to perform two-dimensional orthogonal transform on a plurality of images, an one-dimensional orthogonal transform unit configured to perform one-dimensional orthogonal transform in a direction in which the images are arranged on two-dimensional orthogonal transform coefficient data obtained by performing the two-dimensional orthogonal transform on the images using the two-dimensional orthogonal transform unit, and a three-dimensional orthogonal transform coefficient data encoder configured to encode three-dimensional orthogonal transform coefficient data obtained by performing the one-dimensional orthogonal transform on the two-dimensional orthogonal transform coefficient data using the one-dimensional orthogonal transform unit.

The images may have the high correlations with one another.

The image processing apparatus may further include an image analysis unit configured to analyze the images, and a block-size determination unit configured to determine block sizes, each of which serves as a unit of a process performed by the two-dimensional orthogonal transform unit, in accordance with a result of the analysis performed by the image analysis unit.

The image processing apparatus may further include an image analysis unit configured to analyze the images, a quantization parameter setting unit configured to set quantization parameters used to quantize the three-dimensional orthogonal transform coefficient data in accordance with a result of the analysis performed by the image analysis unit, and a quantization unit configured to quantize the three-dimensional orthogonal transform coefficient data using the quantization parameters set by the quantization parameter setting unit. The three-dimensional orthogonal transform coefficient data encoder may encode the three-dimensional orthogonal transform coefficient data which has been quantized by the quantization unit.

The image processing apparatus may further include a correlation analysis unit configured to analyze the correlations among the images, and a low-correlation image deletion unit configured to delete images which have the low correlations with the other images among the plurality of images in accordance with a result of the analysis performed by the correlation analysis unit.

The image processing apparatus may further include a focus determination unit configured to determine whether the individual images are focused, and a focus flag setting unit configured to set focus flags representing whether the individual images are focused in accordance with a result of the determination performed by the focus determination unit.

The image processing apparatus may further include a storage unit configured to store three-dimensional orthogonal transform encoded data obtained by encoding the three-dimensional orthogonal transform coefficient data using the three-dimensional orthogonal transform coefficient data encoder.

The image processing apparatus may further include a reading unit configured to read the three-dimensional orthogonal transform encoded data stored in the storage unit, and a transform unit configured to transform the three-dimensional orthogonal transform encoded data read from the storage unit using the reading unit into two-dimensional orthogonal transform encoded data which is obtained by encoding the two-dimensional orthogonal transform coefficient data.

The transform unit may include a decoder configured to decode the three-dimensional orthogonal transform encoded data by a decoding method corresponding to an encoding method for the three-dimensional orthogonal transform coefficient data encoder, an one-dimensional inverse orthogonal transform unit configured to perform one-dimensional inverse orthogonal transform in a direction in which the images are arranged on the three-dimensional orthogonal transform coefficient data obtained by decoding the three-dimensional orthogonal transform encoded data using the encoder, and a two-dimensional orthogonal transform coefficient data encoder configured to encode the two-dimensional orthogonal transform coefficient data obtained by performing the inverse orthogonal transform on the three-dimensional orthogonal transform coefficient data using the one-dimensional inverse orthogonal transform unit.

The transform unit may further include an extraction unit configured to extract two-dimensional orthogonal transform coefficient data including a desired image from among a plurality of the two-dimensional orthogonal transform coefficient data obtained by performing the inverse orthogonal transform on the three-dimensional orthogonal transform coefficient data using the one-dimensional inverse orthogonal transform unit, and the two-dimensional orthogonal transform coefficient data encoder encodes the two-dimensional orthogonal transform coefficient data extracted by the extraction unit.

The image processing apparatus may further include a block-size conversion unit configured to convert block sizes, each of which serves as a unit of the two-dimensional orthogonal transform process, of the two-dimensional orthogonal transform coefficient data extracted by the extraction unit. The two-dimensional orthogonal transform coefficient data encoder may encode the two-dimensional orthogonal transform coefficient data obtained through the block-size conversion performed by the block-size conversion unit.

The block-size conversion unit obtains the two-dimensional orthogonal transform coefficient data which has been subjected to the block size conversion by converting the block sizes in a frequency space.

The block-size conversion unit may convert sizes of the blocks after the two-dimensional orthogonal transform coefficient data is subjected to two-dimensional orthogonal transform so that baseband image data is obtained, and obtain the two-dimensional orthogonal transform coefficient data which has been subjected to the block size conversion by performing two-dimensional orthogonal transform on the obtained baseband image data which has been subjected to the block size conversion.

The image processing apparatus may further include a request reception unit configured to receive a request for a desired image, and a supplying unit configured to supply two-dimensional orthogonal transform encoded data which includes the image specified by the request received by the request reception unit and which is obtained through the transform performed by the transform unit to a source of the request of the image. The reading unit may read three-dimensional orthogonal transform encoded data including the image specified by the request received by the request reception unit from the storage unit. The transform unit may transform the three-dimensional orthogonal transform encoded data read from the storage unit using the reading unit into the two-dimensional orthogonal transform encoded data including the image specified by the request received by the request reception unit.

The image processing apparatus may further include a transmission information obtaining unit configured to obtain transmission information regarding transmission of the two-dimensional orthogonal transform encoded data from the supplying unit, and an encoding parameter controller configured to control encoding parameters of the transform unit in accordance with the transmission information obtained by the transmission information obtaining unit.

According to another embodiment of the present disclosure, there is provided an image processing method including performing two-dimensional orthogonal transform on a plurality of images, performing one-dimensional orthogonal transform in a direction in which the images are arranged on two-dimensional orthogonal transform coefficient data obtained by performing the two-dimensional orthogonal transform on the images, and encoding three-dimensional orthogonal transform coefficient data obtained by performing the one-dimensional orthogonal transform on the two-dimensional orthogonal transform coefficient data.

According to a still another embodiment of the present disclosure, there is provided an image processing apparatus including a decoder configured to individually decode a plurality of two-dimensional orthogonal transform encoded data obtained by performing two-dimensional orthogonal transform on a plurality of images, an one-dimensional orthogonal transform unit configured to perform one-dimensional orthogonal transform in a direction in which the images are arranged on a plurality of two-dimensional orthogonal transform coefficient data obtained by decoding the plurality of two-dimensional orthogonal transform encoded data using the decoder, and a three-dimensional orthogonal transform coefficient data encoder configured to encode three-dimensional orthogonal transform coefficient data obtained by performing one-dimensional orthogonal transform on the two-dimensional orthogonal transform coefficient data using the one-dimensional orthogonal transform unit.

The image processing apparatus may further include a temporal storage unit configured to store the two-dimensional orthogonal transform encoded data for a comparatively short term, and a long-term storage unit configured to store three-dimensional orthogonal transform encoded data obtained by encoding the three-dimensional orthogonal transform coefficient data using the three-dimensional orthogonal transform coefficient data encoder for a comparatively long term. The decoder may individually read and decode the plurality of two-dimensional orthogonal transform encoded data stored in the temporal storage unit.

The image processing apparatus may further include a two-dimensional orthogonal transform unit configured to perform two-dimensional orthogonal transform on a plurality of images, and a two-dimensional orthogonal transform coefficient data encoder configured to encode a plurality of two-dimensional orthogonal transform coefficient data obtained by performing the two-dimensional orthogonal transform on the images using the two-dimensional orthogonal transform unit. The temporal storage unit may store the two-dimensional orthogonal transform encoded data obtained by individually encoding the two-dimensional orthogonal transform coefficient data using the two-dimensional orthogonal transform coefficient data encoder for a comparatively short term.

According to a further embodiment of the present disclosure, there is provided an image processing method including individually decoding a plurality of two-dimensional orthogonal transform encoded data obtained by performing two-dimensional orthogonal transform on a plurality of images, performing one-dimensional orthogonal transform in a direction in which the images are arranged on a plurality of two-dimensional orthogonal transform coefficient data obtained by decoding the plurality of two-dimensional orthogonal transform encoded data, and encoding three-dimensional orthogonal transform coefficient data obtained by performing one-dimensional orthogonal transform on the two-dimensional orthogonal transform coefficient data.

According to a still further embodiment of the present disclosure, a plurality of images are individually subjected to two-dimensional orthogonal transform, two-dimensional orthogonal transform coefficient data obtained by performing the two-dimensional orthogonal transform on the images is subjected to one-dimensional orthogonal transform in a direction in which the images are arranged, and three-dimensional orthogonal transform coefficient data obtained by performing the one-dimensional orthogonal transform on the two-dimensional orthogonal transform coefficient data is encoded.

According to a yet further embodiment of the present disclosure, a plurality of two-dimensional orthogonal transform encoded data encoded by performing two-dimensional orthogonal transform on a plurality of images is individually decoded, a plurality of two-dimensional orthogonal transform coefficient data obtained by decoding the plurality of two-dimensional orthogonal transform encoded data is subjected to one-dimensional orthogonal transform in a direction in which the images are arranged, and three-dimensional orthogonal transform coefficient data obtained by performing the one-dimensional orthogonal transform on the two-dimensional orthogonal transform coefficient data is encoded.

Accordingly, images are processed. Especially, capacity used to store encoded data obtained by encoding an image may be reduced while usability of the image is prevented from being deteriorated.

BRIEF DESCRIPTION OF THE DRAWINGS

FIG. 10 is a diagram illustrating 3D-DCT encoding process;

FIG. 11 is a flowchart illustrating an encoding parameter setting process;

FIG. 12 is a flowchart illustrating a correlation process;

FIG. 18 is a diagram illustrating a state of block-size conversion;

FIG. 19 is a flowchart illustrating another image supplying/displaying process;

DETAILED DESCRIPTION OF EMBODIMENTS

Modes for carrying out the present disclosure (hereinafter referred to as "embodiments") will be described hereinafter. Note that a description will be made in the following order.
1. First Embodiment (Image Processing System)
2. Second Embodiment (Image Processing System)
3. Third Embodiment (Personal Computer)
1. First Embodiment
Configuration of Image Processing System FIG. 1 is a block diagram schematically illustrating a configuration of an image processing system according to a first embodiment of the present disclosure.

Figure 1:
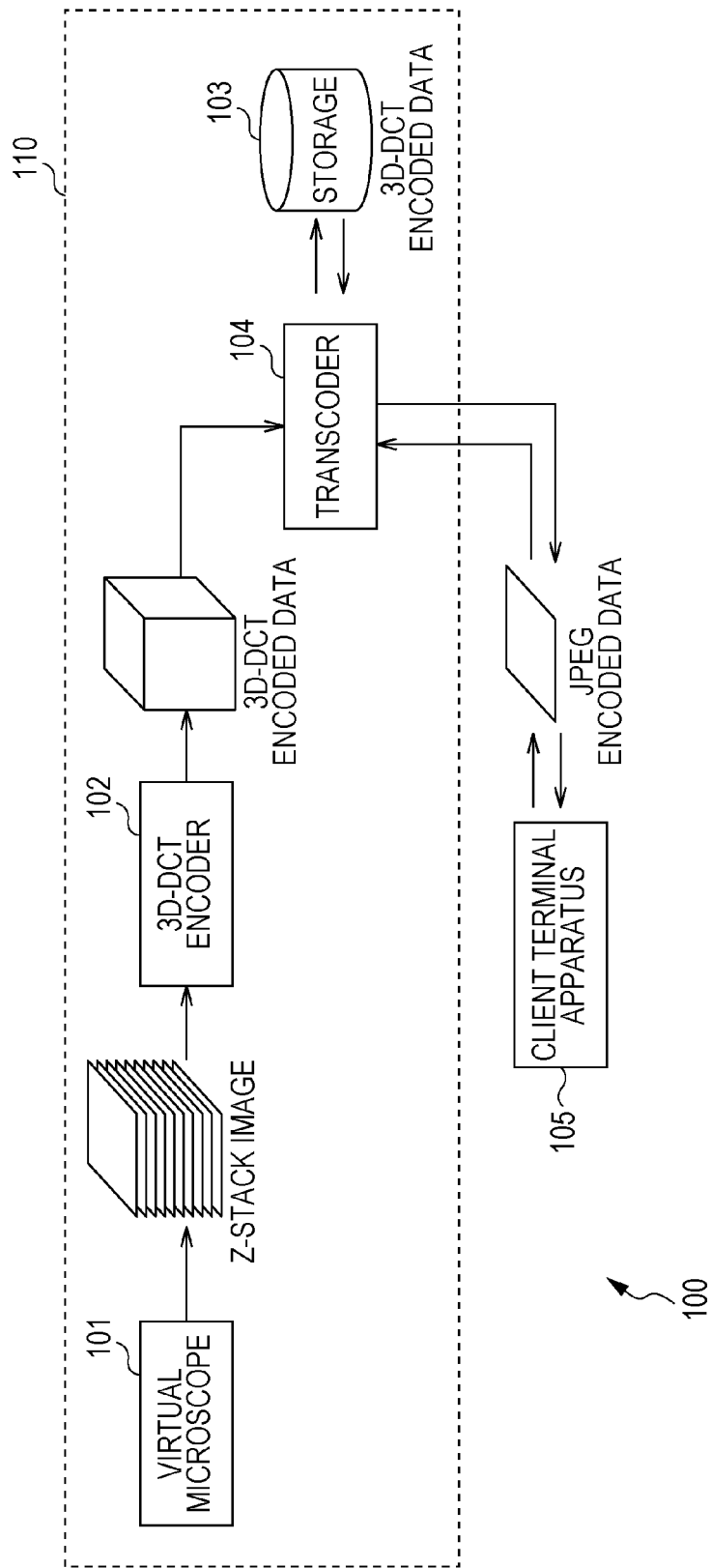
FIG. 1 is a block diagram schematically illustrating a configuration of an image processing system according to a first embodiment of the present disclosure.
Figure 2:
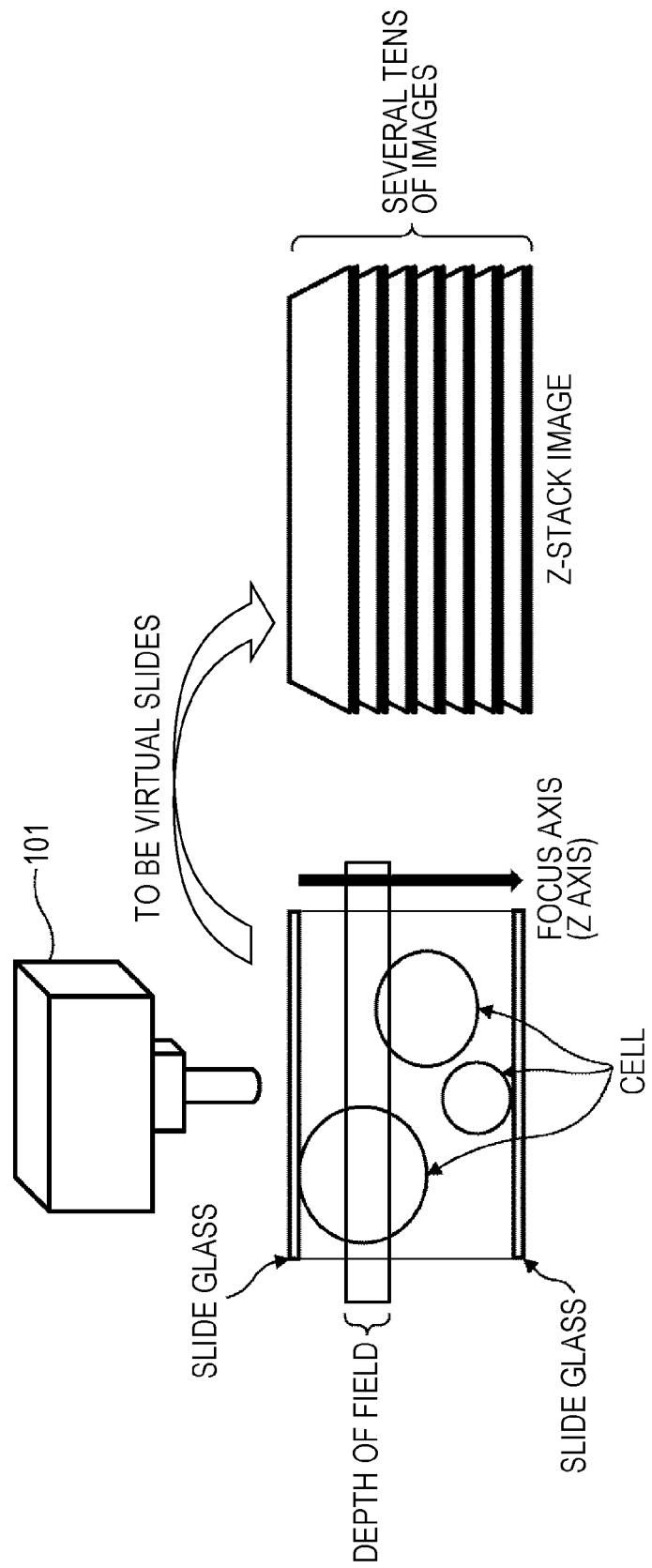
FIG. 2 is a diagram illustrating an operation of a virtual microscope.

An image processing system 100 shown in FIG. 1 which is used for cytoscreening and a tissue diagnosis, for example, captures a specimen, encodes digital image data to be stored and managed, decodes a portion of the digital image data where appropriate, and displays an image of the specimen corresponding to the portion of the digital image data.

As shown in FIG. 1, the image processing system 100 includes a virtual microscope 101, a 3D-DCT (3 Dimensional-Discrete Cosine Transform) encoder 102, a storage 103, a transcoder 104, and a client terminal apparatus 105.

In general, specimens used in pathological diagnoses such as cytoscreening and tissue diagnoses have thicknesses of themselves.

The virtual microscope 101 captures such a specimen from a plurality of focus positions (by changing a Z coordinate of a focus position) so as to obtain a plurality of images (several tens of images, for example) (hereinafter also referred to as "focus plane images"). That is, a plurality of captured images (focus plane images) are generated from a single specimen (a cell group sandwiched by a pair of slid glasses, for example). Then, the plurality of captured images correspond to the different focus positions. Hereinafter, such a group of the captured images (focus plane images) is referred to as a "Z-stack image".

Referring back to FIG. 1, the virtual microscope 101 captures a specimen so as to generate a Z-stack image and supplies the Z-stack image to the 3D-DCT encoder 102.

The 3D-DCT encoder 102 performs encoding including 3-dimensional discrete cosine transform so as to generate 3D-DCT encoded data. The 3-dimensional discrete cosine transform will be described hereinafter.

The 3D-DCT encoder 102 supplies the generated 3D-DCT encoded data through the transcoder 104 to the storage 103 which stores (holds) the 3D-DCT encoded data. Note that the 3D-DCT encoder 102 may supply the 3D-DCT encoded data to the storage 103 which stores (holds) the 3D-DCT encoded data without using the transcoder 104.

A user who performs a diagnosis of the specimen operates the client terminal apparatus 105 so that the client terminal apparatus 105 displays an image of the specimen captured by the virtual microscope 101 as an observation image. The client terminal apparatus 105 requests the transcoder 104 to transmit an image to be displayed in accordance with the user's operation or the like. For example, the client terminal apparatus 105 specifies a position of a portion to be displayed as the observation image, a focus position, a resolution, and the like.

The transcoder 104 obtains the 3D-DCT encoded data including the image requested by the client terminal apparatus 105 from the storage 103, performs a conversion process so as to generate JPEG encoded data representing the image requested by the client terminal apparatus 105, and supplies the JPEG encoded data to the client terminal apparatus 105.

When receiving the JPEG encoded data, the client terminal apparatus 105 decodes the JPEG encoded data and displays the JPEG encoded data as the observation image. As described above, the image processing system 100 may display the arbitrary portion of the Z-stack image (part of or the entire image) stored in the storage 103 as the observation image in a monitor of the client terminal apparatus 105.

As described above, the image processing system 100 causes the 3D-DCT encoder 102 to encode the Z-stack image and causes the storage 103 to store the 3D-DCT encoded data. Specifically, since compression utilizing the correlations among the focus plane images is performed also in a focus direction (Z direction), an amount of information is reduced. That is, the image processing system 100 may reduce capacity used to store the Z-stack image (3D-DCT encoded data) in the storage 103, and accordingly, reduce a load applied to the storage 103.

Furthermore, 2-dimensional discrete cosine transform coefficient data (2D-DCT coefficient data) may be generated from the 3D-DCT encoded data without decoding the entire 3D-DCT encoded data to the baseband. Specifically, the transcoder 104 may easily generate JPEG image data requested by the client terminal apparatus 105 from the 3D-DCT encoded data stored in the storage 103. Accordingly, the image processing system 100 may reduce a load caused by the conversion process.

Furthermore, the conversion process may be performed by the transcoder 104 which supplies an image (on a server side), the image processing system 100 may reduce a load applied to the client terminal apparatus 105.

Moreover, in the image processing system 100, an image is transmitted from the transcoder 104 to the client terminal apparatus 105 as JPEG encoded data. Accordingly, the image processing system 100 reduces an amount of data to be transmitted and reduces a load applied at the time of the transmission. Furthermore, since JPEG encoded data is transmitted, even a general client terminal apparatus 105 may receive the data from the transcoder 104 and display an image. That is, the client terminal apparatus 105 is not necessary to newly support a special encoding method, and therefore, general versatility is improved.

As described above, since 3D-DCT encoded data is easily decoded and transmitted, when the 3D-DCT encoded data is stored in the storage 103, speed of a response of the image processing system 100 to a request from the client terminal apparatus 105 may be improved.

Note that the devices included in a dotted frame 110 shown in FIG. 1 may be arbitrarily combined with one another. For example, the 3D-DCT encoder 102 to the transcoder 104 may be configured as a server (single device) which supplies an image to the client terminal apparatus 105. Alternatively, the virtual microscope 101 may be included in the server. It is apparent that other combinations may be employed.

Configuration of 3D-DCT Encoding Apparatus

Figure 3:
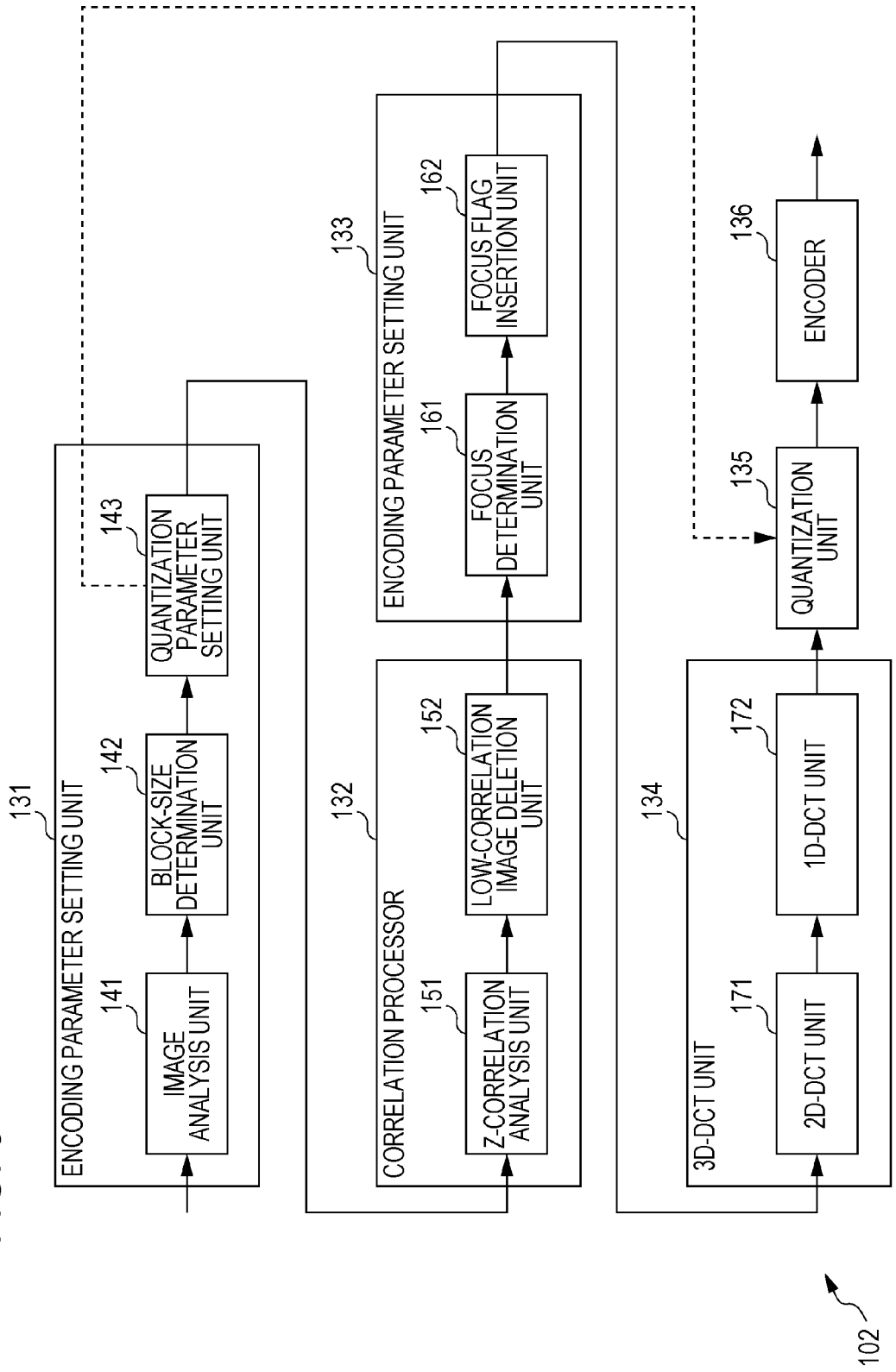
FIG. 3 is a block diagram schematically illustrating a configuration of a 3D-DCT encoding apparatus.

FIG. 3 is a block diagram schematically illustrating a configuration of the 3D-DCT encoder 102 shown in FIG. 1. As shown in FIG. 3, the 3D-DCT encoder 102 includes an encoding parameter setting unit 131, a correlation processor 132, an encoding parameter setting unit 133, a 3D-DCT unit 134, a quantization unit 135, and an encoder 136.

The encoding parameter setting unit 131 sets encoding parameters such as block sizes and quantization parameters in accordance with the Z-stack image supplied from the virtual microscope 101. The correlation processor 132 checks the correlation of the Z-stack image (the correlation among the focus plane images) in a Z direction supplied from the virtual microscope 101 and deletes focus plane images which have low correlations between the others. The encoding parameter setting unit 133 determines whether the specimen included in the focus plane images of the Z-stack image supplied from the virtual microscope 101 is focused and generates focus flags representing whether the specimen is focused.

The 3D-DCT unit 134 performs 3-dimensional discrete cosine transform (3D-DCT) on the Z-stack image supplied from the virtual microscope 101.

Figure 4:
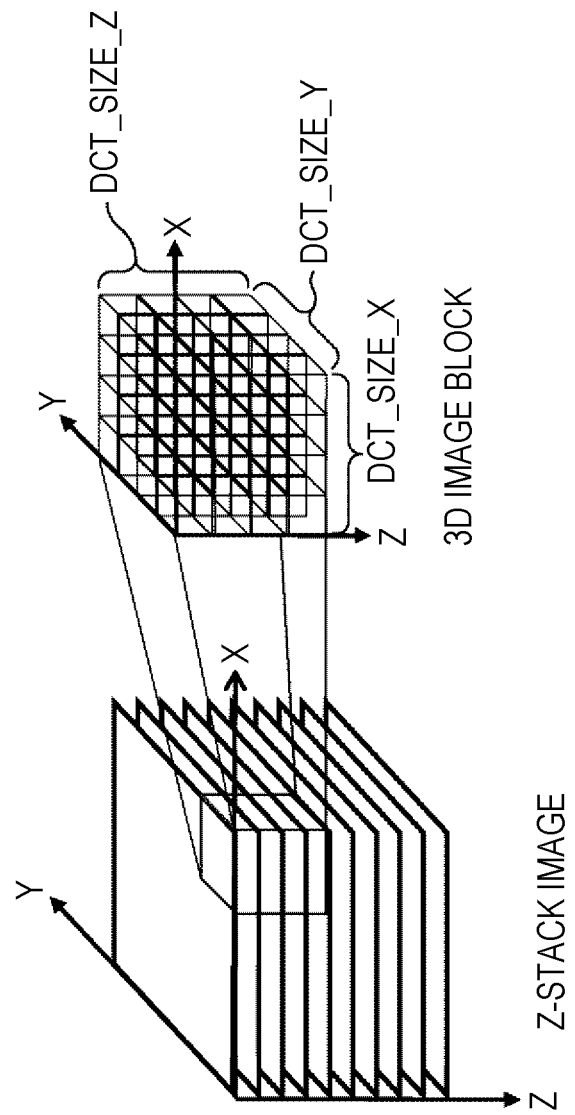
FIG. 4 is a diagram illustrating 3D-DCT.

FIG. 4 briefly illustrates the 3-dimensional discrete cosine transform (3D-DCT). Assuming that the focus plane images included in the Z-stack image are constituted in an XY plane and focus positions of the focus plane images are located on a Z axis, as shown in a right portion in FIG. 4, the images included in the Z-stack image are arranged in an XYZ space.

Also in a case of 3-dimensional discrete cosine transform, a process is performed for individual predetermined blocks.

However, in the case of 3-dimensional discrete cosine transform, as shown in FIG. 4, the process is performed for individual 3-dimensional pixel blocks. In FIG. 4, "DCT_SIZE_X" denotes sizes of the 3-dimensional pixel blocks in an X direction (that is, processing units in the X direction), "DCT_SIZE_Y" denotes sizes of the 3-dimensional pixel blocks in a Y direction (that is, processing units in the Y direction), and "DCT_SIZE_Z" denotes sizes of the 3-dimensional pixel blocks in a Z direction (that is, processing units in the Z direction).

The quantization unit 135 quantizes coefficient data (3D-DCT coefficient data) generated by the 3D-DCT unit 134. For example, the quantization unit 135 quantizes 3D-DCT coefficient data using the quantization parameters set by a quantization parameter setting unit 143 included in the encoding parameter setting unit 131.

The encoder 136 performs run-length Huffman encoding on the quantized 3D-DCT coefficient data so as to generate 3D-DCT encoded data. The encoder 136 supplies the generated 3D-DCT encoded data to the transcoder 104 (shown in FIG. 1).

Instead of use of a unit of a 2-dimensional XY pixel block employed in the JPEG, aggregative redundancy is eliminated using a unit of a 3-dimensional XYZ pixel block, and accordingly, the 3D-DCT encoder 102 may improve encoding efficiency (compression rate).

The 3-dimensional discrete cosine transform (3D-DCT) is merely used in general moving-image codec. When general moving images are captured, since an object moves or is changed with time, the correlation in a time direction represented by the third axis (Z direction in this case) is low. It is difficult to improve the encoding efficiency (compression rate) even when the 3-dimensional discrete cosine transform is performed on such an image. However, in a case of the Z-stack image, since the focus plane images are obtained by only changing a focus plane viewed from the same observing point, the high correlation is obtained among the focus plane images. Accordingly, by removing the redundancy in the Z direction using the 3D-DCT as described above, the 3D-DCT encoder 102 may improve the encoding efficiency (compression rate).

Returning back to FIG. 3, the encoding parameter setting unit 131 includes an image analysis unit 141, a block-size determination unit 142, and the quantization parameter setting unit 143.

The image analysis unit 141 analyzes the focus plane images of the Z-stack image supplied from the virtual microscope 101. The block-size determination unit 142 determines sizes of 3D pixel blocks (sizes in X, Y, and Z directions) in accordance with a result of the analysis. The quantization parameter setting unit 143 sets quantization parameters in accordance with the analysis result.

Note that, after the block-size determination unit 142 determines the sizes of the 3D pixel blocks, processes are performed for individual 3D pixel blocks. Specifically, the setting of the quantization parameters using the quantization parameter setting unit 143 is performed for individual blocks. Processes of the correlation processor 132, the encoding parameter setting unit 133, the 3D-DCT unit 134, the quantization unit 135, and the encoder 136 which are arranged in the latter stage are similarly performed. Note that the quantization parameter setting unit 143 may set the quantization parameters in a unit of a Z-stack image, in a unit of a sequence, or the like, which is larger than a unit of a block.

For example, in general, an image used for cytoscreening is divided into a cell portion to be observed and the other portion. The cell portion mainly includes high frequency components whereas the other portion which may not include anything mainly includes low frequency components. Furthermore, due to its object, the cell portion to be observed has a high degree of importance and preferably has high image quality even though a coding amount is increased. On the other hand, the other portion is not to be observed and has a low degree of importance. Accordingly, a small coding amount is preferably attained even though image quality is low.

Therefore, the block-size determination unit 142 sets sizes of blocks included in a region which includes an object to be observed such as a cell (region of interest) to be small so as to suppress deterioration of image quality due to encoding. Furthermore, the block-size determination unit 142 sets sizes of blocks included in a region which does not include the object to be observed such as a cell (region of uninterest) to be large so as to reduce the encoding amount and improve the encoding efficiency (compression rate).

Although depending on a captured image (an object to be observed), in general, when a block size becomes large, encoding efficiency is improved. However, when a size of a block is too large, it is highly possible that the block includes a high-frequency component such as an edge. Accordingly, deviation in the vicinity of a direct current (DC) component of orthogonal transform coefficient data becomes small, and as a result, the encoding efficiency may be deteriorated. Furthermore, since the high frequency components are cut at a time of quantization, an undesired blur may be generated in the vicinity of the edge of a decoded image.

In terms of the compression efficiency and subjective image-quality evaluation, in general, block sizes (DCT_SIZE_X and DCT_SIZE_Y) on a focus plane image plane are preferably approximately 32 pixels or approximately 64 pixels. The block sizes may be appropriately changed in the focus planes in accordance with edge information or the like included in the blocks. Note that, when transcoding is performed at high speed to obtain JPEG data, an expression "DCT_SIZE_X=DCT_SIZE_Y=8" is preferably satisfied. Furthermore, a unit of orthogonal transform processing (DCT_SIZE_Z) on a focus axis may be set in accordance with a capturing duration (pitch) and a depth of field at a time of image capturing.

Furthermore, in general, when the correlation in the Z direction (focus axis direction) is high, data which has been subjected to the 3-dimensional discrete cosine transform (3D-DCT(DATA)) has a distribution characteristic in which a large DCT coefficient value is generated in a DC (direct current) component (3D block origin) and a coefficient value of an AC (alternate current) component becomes smaller as a position becomes far from the 3D block origin. Here, coefficient values in a high-frequency region in the Z direction are small and large coefficient values are mainly distributed in the vicinity of positions represented by (X, Y, Z)=(0, 0, Z).

Figure 5A:
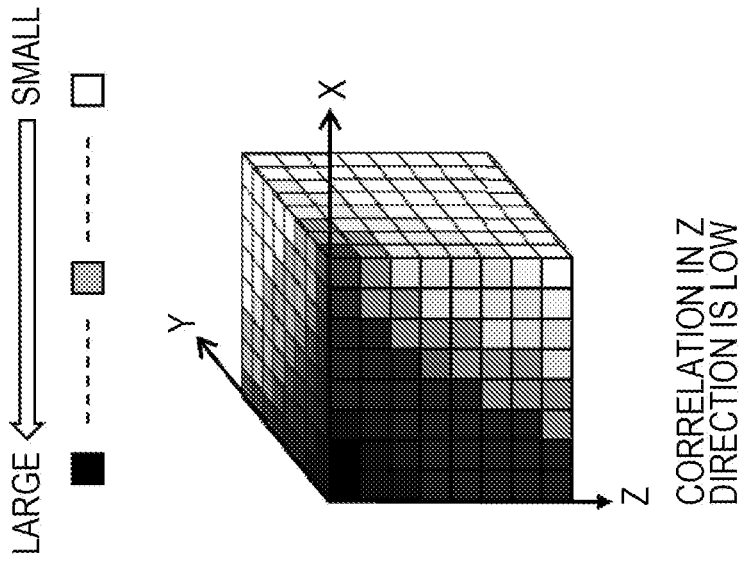
FIGS. 5A and 5B are diagrams illustrating distribution of DCT coefficients of 3D-DCT.

In this case, when high frequencies in the Z direction are removed in addition to high frequencies in the X and Y directions, the encoding efficiency (compression rate) can be improved while visible deterioration is suppressed. Accordingly, when correlation in the Z direction is high, a 3D quantization matrix has a distribution characteristic in which the values shown in FIG. 5A are inversed. That is, small quantization values are assigned to portions in the vicinity of the 3D block origin having the large coefficient value whereas large quantization values are assigned to high frequency regions having small coefficient values. By this, when the matrix which cuts high frequency components is employed, the encoding efficiency (compression rate) may be improved while the visual deterioration is suppressed.

Figure 5B:
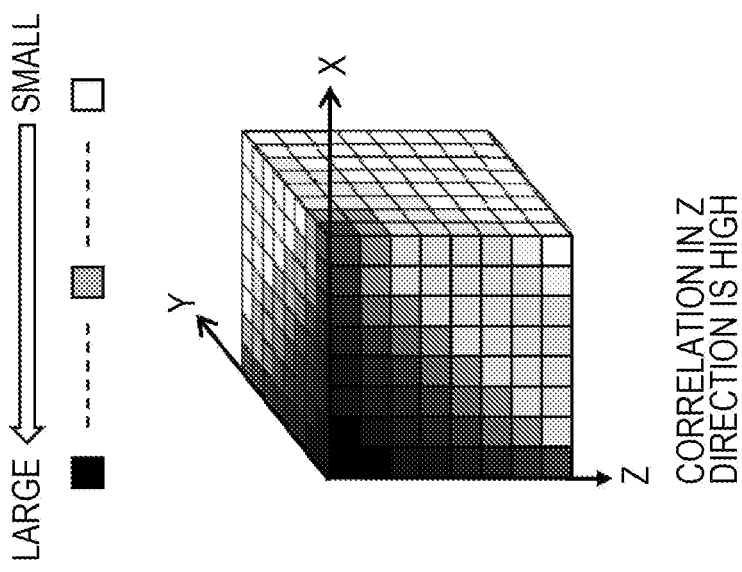

On the other hand, when the correlation in the Z direction is low, as shown in FIG. 5B, DCT coefficients are less concentrated in the vicinity of the 3D block origin and comparatively large DCT coefficients are generated also in the high frequency regions in the Z direction.

In this case, when the 3D matrix for the high correlation in the Z direction described above is employed, it is possible that the visual deterioration is increased. Therefore, when the correlation in the Z direction is low, a matrix in which small quantization values are assigned to high frequency components in the X, Y, and Z directions is preferably used, instead of the 3D matrix used when the correlation in the Z direction is high as described above, so that the high frequency components remain to some extent. That is, a matrix having a distribution characteristic in which values of distribution shown in FIG. 5B are inversed is preferably used.

Figure 6:
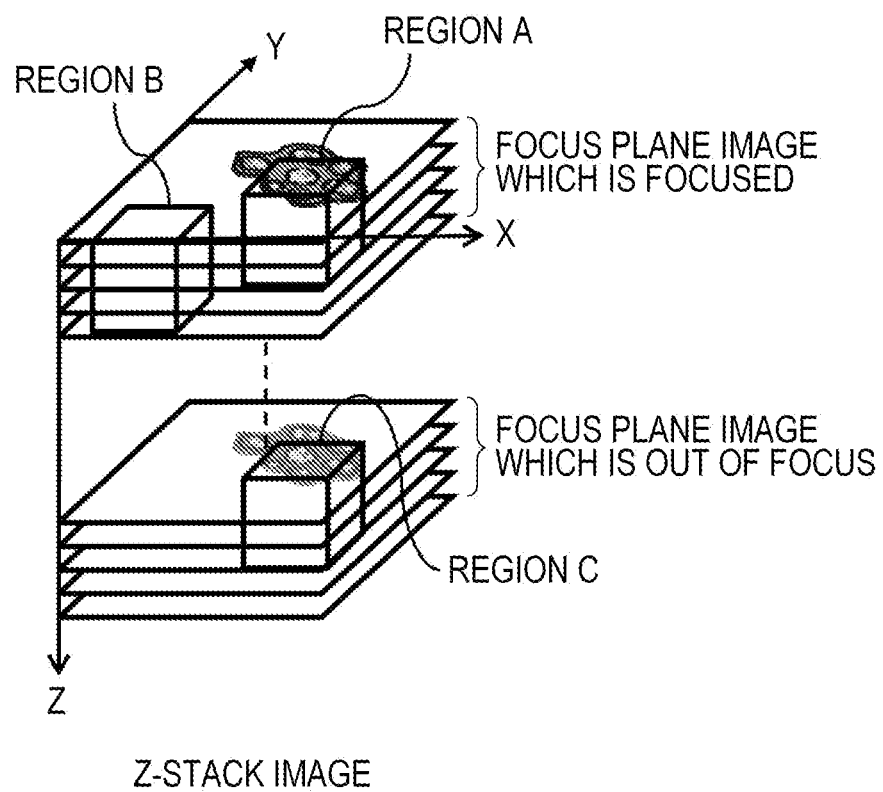
FIG. 6 is a diagram illustrating a state of z-correlation.

Accordingly, the quantization parameter setting unit 143 selectively uses one of a plurality of types (two types, for example) of quantization matrix depending on the regions for each block as shown in FIG. 6, for example.

In general, blocks which include the specimen (sample) have complicated texture, and therefore, it is likely that the low correlation in the Z direction is obtained. Furthermore, blocks which include large portions which have been focused have a high resolution of an image of the specimen (sharp contour), and accordingly, it is likely that the low correlation is obtained. In this condition (shown as a region A in FIG. 6, for example), the quantization matrix for the low correlation in the Z direction described above is preferably employed (to improve the encoding efficiency).

On the other hand, it is likely that regions which includes small portions of the specimen or which does not include the specimen (represented by a region B in FIG. 6, for example) have the high correlation in the Z direction. Furthermore, blocks which include large portions of images which include the specimen which is out of focus and which is blurred (represented by a region C included in the region A in FIG. 6, for example) have the high correlation due to the low resolution of the specimen (blur of contours). In this case, the quantization matrix for the high correlation in the Z direction described above is preferably used (to improve the encoding efficiency).

Note that the selective use of the two types of quantization matrix is performed in an arbitrary unit, and a unit of sequence may be employed, for example.

Specifically, the quantization parameter setting unit 143 determines a state of an object to be processed (image) among the cases described above in accordance with the result of the analysis performed by the image analysis unit 141 and sets appropriate quantization parameters in accordance with a result of the determination.

Note that the image analysis unit 141 may check degrees of the correlations among the focus plane images and the quantization parameter setting unit 143 may set appropriate quantization parameters in accordance with the degrees.

Referring back to FIG. 3, the correlation processor 132 includes a Z-correlation analysis unit 151 and a low-correlation image deletion unit 152.

The Z-correlation analysis unit 151 checks degrees of the correlations among the focus plane images for individual blocks. The low-correlation image deletion unit 152 deletes, when one of the focus plane images has low correlations with the others in blocks to be processed (for example, the correlation with the adjacent focus plane images in the Z direction), the focus plane image from the Z-stack image.

For example, a focus plane image which is considerably different from the other focus plane images may be obtained for some reasons including a case where a position of the specimen is shifted, a case where a condition of light (brightness or the like) is considerably changed, a case where a dust or dirt is mixed in, or the like while image capturing is repeatedly performed to generate a Z-stack image.

In the 3-dimensional cosine transform process described above, the encoding efficiency (compression rate) is improved making use of a degree of the correlations in the Z direction. Therefore, in a case where a focus plane image which has the considerably low correlation in the Z direction is included in the 3D pixel block to be encoded, the encoding efficiency (compression rate) may be considerably degraded due to the presence of the image.

Furthermore, for example, a focus plane image which has the low correlation with the other focus plane images to the degree that differences between the focus plane image and the other focus plane images are visibly recognized may disturb the observation of the specimen. An image including dust, an image which is too dark, and the like may be unnecessary images for the diagnosis (it is highly likely that such images have low degrees of importance).

Therefore, the low-correlation image deletion unit 152 deletes focus plane images which have the low correlations and which have low degrees of importance in the individual blocks to suppress undesired deterioration of the encoding efficiency.

A criterion (threshold value) for determining the degrees of the correlations is arbitrarily set, and is preferably a low level to the degree that differences between an image and other images are visually detectable (for example, a level lower than levels of the portions which have the low correlations in the normal focus plane image such as the region A shown in FIG. 6).

Note that the "deletion" of the focus plane images which have the low correlations among the blocks performed by the low-correlation image deletion unit 152 means deletion from the Z-stack image, that is, removal (separation) from the Z-stack image. Data of the removed focus plane images having the low correlations may be actually deleted (discarded) or may be stored in the storage 103, for example, as data (a file) separately from the Z-stack image from which the focus plane images having the low correlations have been removed (extracted). The data of the focus plane images having the low correlations may be stored after being encoded in an arbitrary method (the JPEG or other encoding methods).

Note that the stored focus plane image data having the low correlation may be reused for an arbitrary purpose. For example, when a user who uses the client terminal apparatus 105 performs detailed (precise) observation, the stored focus plane image data having the low correlation may be read along with the Z-stack image to be used. Accordingly, the focus plane image data having the low correlation may be associated with the Z-stack image from which the data is extracted before being stored in the storage 103.

In FIG. 3, the encoding parameter setting unit 133 includes a focus determination unit 161 and a focus flag insertion unit 162.

The focus determination unit 161 checks whether the specimen included in the focus plane images are focused in the individual blocks. The focus flag insertion unit 162 generates focus flags representing whether the specimen is focused in the individual blocks of the focus plane images in accordance with a result of the checking and inserts the focus flags into the image data (a header of the image data, for example).

The focus flags representing whether the specimen is focused are stored in the storage 103 along with the image data and used in a process of reproducing an image corresponding to the image data, for example. By this, when the image is reproduced, a focus point is easily recognized, and appropriate image processing such as a filter process may be performed in accordance with a determination regarding the determination as to whether the specimen is focused.

In this way, the 3D-DCT encoder 102 may efficiently perform encoding without deteriorating image quality at most in accordance with content of the image.

In FIG. 3, the 3D-DCT unit 134 includes a 2D-DCT unit 171 and an 1D-DCT unit 172.

The 2D-DCT unit 171 performs 2-dimensional discrete cosine transform on the focus plane images of the individual blocks (on the XY plane) so as to generate 2D-DCT coefficient data. The 1D-DCT unit 172 performs 1-dimensional discrete cosine transform on 2D-DCT coefficient data groups of the individual blocks in the Z direction (a direction in which the plurality of images which constitute the Z-stack image are arranged).

Specifically, the 1D-DCT unit 172 performs discrete cosine transform on coefficient data in the same positions (corresponding to pixels in the same positions) in the 2D-DCT coefficient data.

The 1D-DCT unit 172 supplies 3D-DCT coefficient data generated for individual blocks by performing the discrete cosine transform on the coefficient data in various positions in the Z direction to the quantization unit 135. The 3D-DCT coefficient data obtained for individual blocks are quantized, encoded, and stored in the storage 103 as described above.

Configuration of Transcoder

Figure 7:
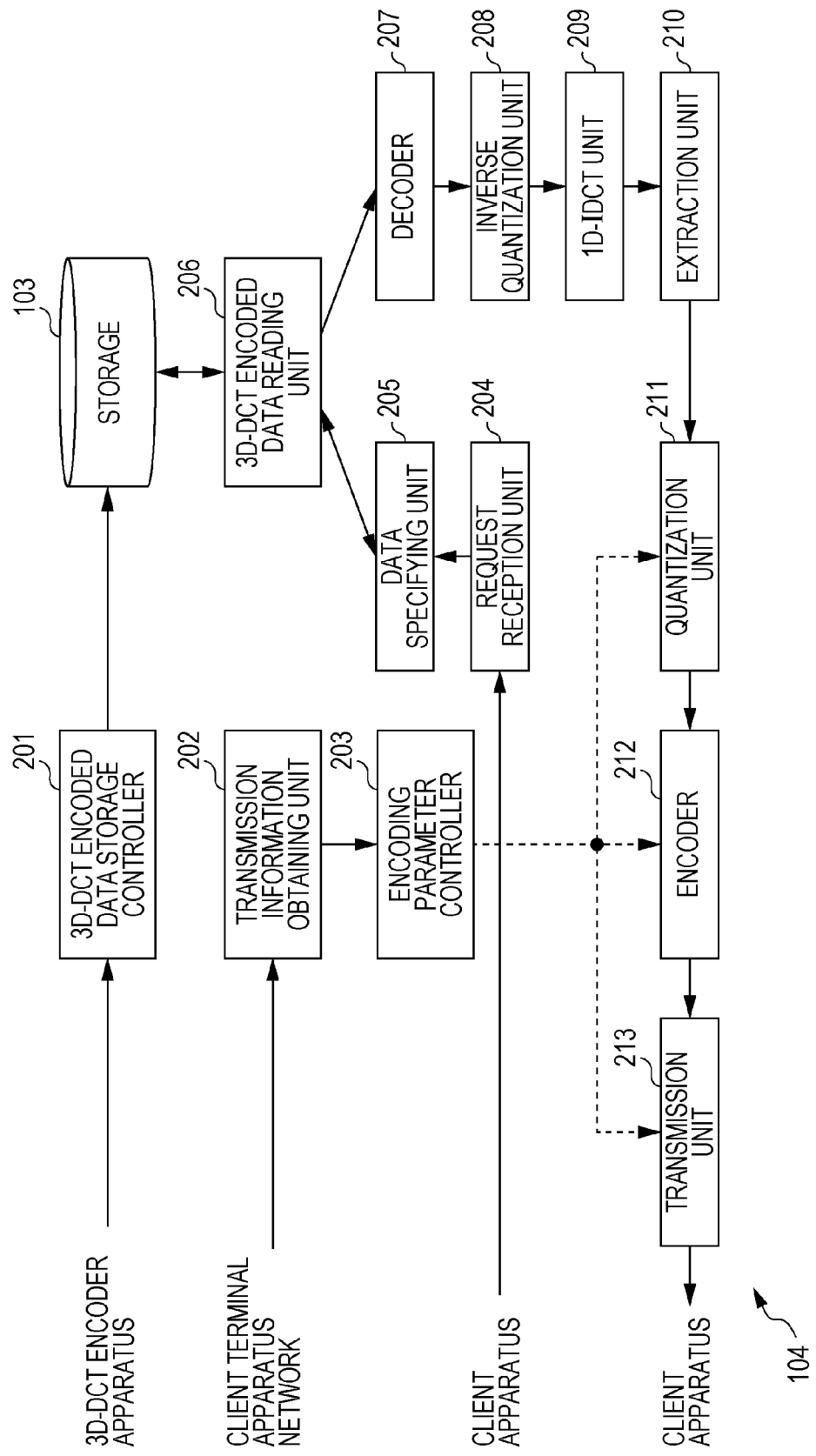
FIG. 7 is a block diagram schematically illustrating a configuration of a transcoder.

FIG. 7 is a block diagram schematically illustrating a configuration of the transcoder 104 shown in FIG. 1.

As shown in FIG. 7, the transcoder 104 includes a 3D-DCT encoded data storage controller 201, a transmission information obtaining unit 202, an encoding parameter controller 203, a request reception unit 204, a data specifying unit 205, and a 3D-DCT encoded data reading unit 206. The transcoder 104 further includes a decoder 207, an inverse quantization unit 208, an 1D-IDCT unit 209, an extraction unit 210, a quantization unit 211, an encoder 212, and a transmission unit 213.

The 3D-DCT encoded data storage controller 201 supplies the 3D-DCT encoded data supplied from the 3D-DCT encoder 102 to the storage 103 which stores the 3D-DCT encoded data.

Figure 8:
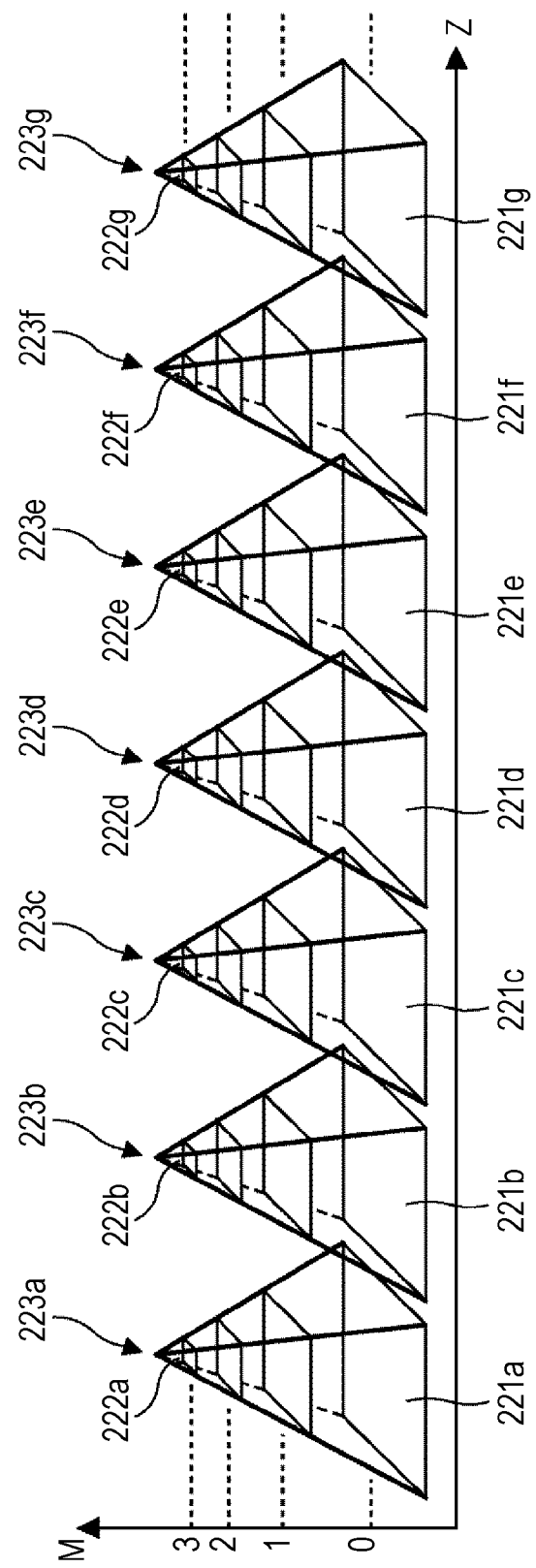
FIG. 8 is a diagram illustrating a configuration of stored data.

FIG. 8 is a diagram illustrating pyramid structures of the focus plane images stored in the storage 103. In FIG. 8, an axis of abscissa denotes a focus direction axis (Z axis) and an axis of ordinate denotes a magnification (resolution) direction axis (M axis). As shown in FIG. 8, image pyramid structures 223a to 223g are generated for focus plane images 221a to 221g, respectively. The image pyramid structures 223a to 223g are image groups generated for the focus plane images 221a to 221g by different resolutions.

The focus plane images 221a to 221g of the largest sizes are arranged in lowermost layers (M=0) of the image pyramid structures 223a to 223g whereas focus plane images 222a to 222g of the smallest sizes are arranged in the uppermost layers (M=3) of the image pyramid structures 223a to 223g. A resolution for the focus plane images 221a to 221g having the largest sizes is 50×50 Kpixel (kilo pixel) or 40×60 Kpixel. A resolution for the focus plane images 222a to 222g having the smallest sizes is 256×256 pixel or 256×512 pixel.

Focus plane images corresponding to low magnifications (M=1, 2, and 3) are generated by reducing sizes of the focus plane images 221a to 221g corresponding to a high magnification (M=0) using a filter such as a Lanczos filter. A reduction rate of 1/2, 1/4, 1/8, or smaller is selected, for example.

The image pyramid structures 223a to 223g enable realization of an operation the same as an operation of changing a magnification of an image obtained by an optical microscope.

As described above, the focus plane images of various magnifications are individually stored in the storage 103. Note that, hereinafter, a description will be made while it is assumed that block sizes of the XY plane of the encoded data stored in the storage 103 are 8×8 (DCT_SIZE_X=DCT_SIZE_Y=8).

Referring back to FIG. 7, the transmission information obtaining unit 202 collects, as transmission information, information on capability (processing ability) of the client terminal apparatus 105 and information on a transmission path such as a usable band width of a network serving as the transmission path extending from the transcoder 104 to the client terminal apparatus 105. When obtaining the transmission information from the client terminal apparatus 105 and the network, the transmission information obtaining unit 202 supplies the transmission information to the encoding parameter controller 203.

The encoding parameter controller 203 sets encoding parameters such as quantization parameters, a target encoding rate, and a transmission rate in accordance with the supplied transmission information so as to enable appropriate data transmission and controls the quantization unit 211, the encoder 212, and the transmission unit 213 using the encoding parameters. The encoding parameters are arbitrarily determined and any parameter may be the encoding parameter.

The request reception unit 204 receives an image request supplied from the client terminal apparatus 105. The image requested by the client terminal apparatus 105 is included in the 3D-DCT encoded data stored in the storage 103. In this request, a position, a focus position, a resolution, and the like of the requested image in the Z-stack image are specified, for example. The request reception unit 204 supplies the received request to the data specifying unit 205.

The data specifying unit 205 obtains information on the 3D-DCT encoded data stored in the storage 103 through the 3D-DCT encoded data reading unit 206 and specifies the 3D-DCT encoded data including the requested image (which is specified by the position, the focus position, the resolution, and the like in accordance with the request) in a unit of a block.

The 3D-DCT encoded data reading unit 206 reads the 3D-DCT encoded data specified by the data specifying unit 205 for individual blocks from the storage 103 and supplies the 3D-DCT encoded data to the decoder 207.

The decoder 207 decodes the 3D-DCT encoded data for individual blocks which is supplied from the 3D-DCT encoded data reading unit 206 using a method which is compatible with the encoder 136 (shown in FIG. 3) so as to generate quantized 3D-DCT coefficient data for individual blocks, and supplies the generated data to the inverse quantization unit 208.

The inverse quantization unit 208 performs inverse quantization on the quantized 3D-DCT coefficient data supplied from the decoder 207 for individual blocks so as to generate 3D-DCT coefficient data for individual blocks, and supplies the generated data to the 1D-IDCT unit 209.

The 1D-IDCT unit 209 performs 1-dimensional inverse discrete cosine transform (IDCT) in the Z direction on the 3D-DCT coefficient data of the individual blocks supplied from the inverse quantization unit 208 so as to generate 2D-DCT coefficient data for individual blocks.

By performing the inverse discrete cosine transform process, the 2D-DCT coefficient data (coefficient data obtained through the discrete cosine transform in the XY plane direction) corresponding to the focus plane images of the blocks to be processed is generated. The 1D-IDCT unit 209 supplies the generated 2D-DCT coefficient data of the individual blocks included in the focus plane images to the extraction unit 210.

The extraction unit 210 extracts 2D-DCT coefficient data of blocks corresponding to focus plane images which include the image specified in accordance with the request supplied from the client terminal apparatus 105 from among the supplied 2D-DCT coefficient data of the blocks corresponding to the focus plane images, and supplies the extracted 2D-DCT coefficient data to the quantization unit 211.

The quantization unit 211 quantizes the supplied 2D-DCT coefficient data of the blocks under control of the encoding parameter controller 203 and supplies the quantized 2D-DCT coefficient data of the blocks to the encoder 212. The encoder 212 performs the run-length Huffman encoding on the quantized 2D-DCT coefficient data of the blocks under control of the encoding parameter controller 203 so as to generate JPEG encoded data which conforms to the JPEG standard. The encoder 212 supplies the generated JPEG encoded data to the transmission unit 213.

The transmission unit 213 supplies the supplied JPEG encoded data to the client terminal apparatus 105 which is a source of the request under control of the encoding parameter controller 203.

As described above, the transcoder 104 converts all the 3D-DCT encoded data into the JPEG encoded data without decoding the 3D-DCT encoded data to the baseband.

Especially, when a block size of a focus plane (XY plane) is 8×8 (DCT_SIZE_X=DCT_SIZE_Y=8) as described above, 2D-DCT coefficient data used to generate JPEG encoded data may be obtained from 3D-DCT coefficient data by only performing an inverse discrete cosine transform process (IDCT) in the Z direction using the 1D-IDCT unit 209.

That is, since a load of the transform process is reduced, the transcoder 104 performs the transform process at higher speed. Therefore, the transcoder 104 responds to the request supplied from the client terminal apparatus 105 at high speed (the response speed is improved).

Furthermore, the transcoder 104 may supply, to the client terminal apparatus 105, only the JPEG encoded data of the focus plane images which include the image requested by the client terminal apparatus 105 and which are included in the blocks including the image. Accordingly, the transcoder 104 may reduce an amount of data to be transmitted and further reduce loads applied to the transcoder 104, the client terminal apparatus 105, and the network serving as the transmission path.

Furthermore, since the transcoder 104 supplies the requested image as the JPEG encoded data, the client terminal apparatus 105 only performs decoding of the JPEG encoded data. Accordingly, a load applied to the client terminal apparatus 105 is reduced and general versatility is improved.

Moreover, since the transcoder 104 collects information such as information on capability of the client terminal apparatus 105 and information on bands in the network as transmission information and controls the encoding parameters in accordance with the transmission information, the transcoder 104 may appropriately control quality of the image to be supplied to the client terminal apparatus 105 and data size of the image depending on a situation.

Configuration of Client Terminal Apparatus

Figure 9:
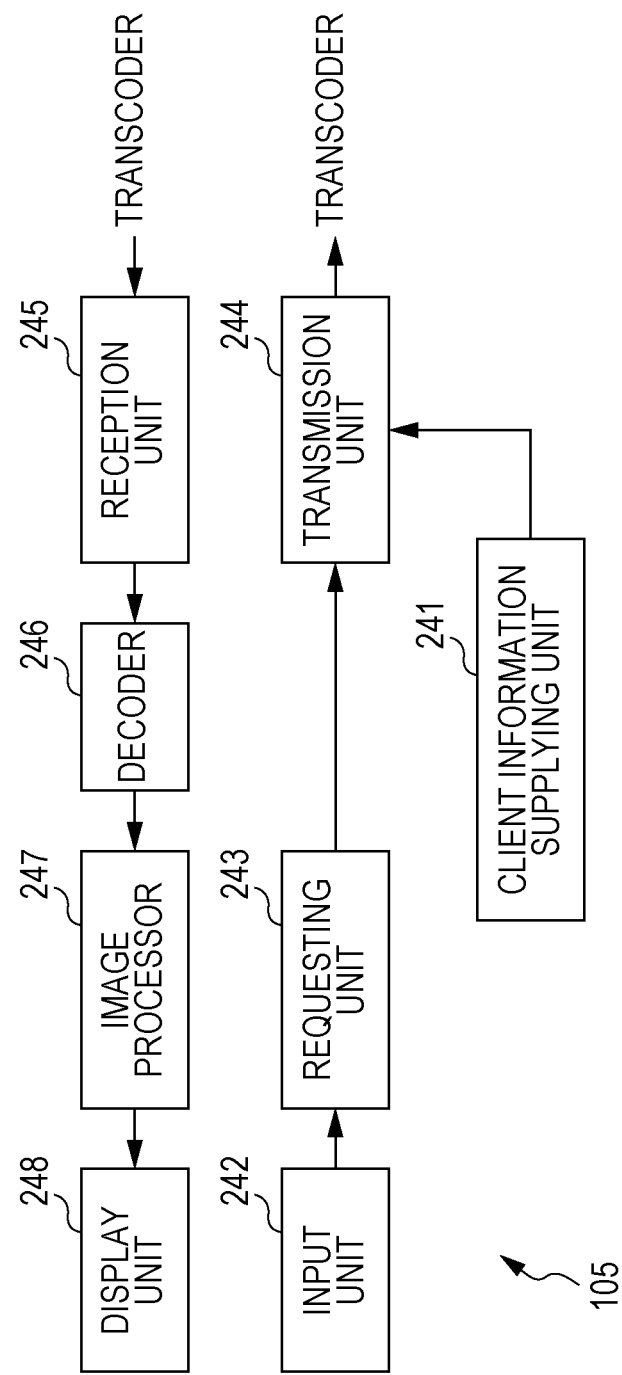
FIG. 9 is a block diagram schematically illustrating a configuration of a client terminal apparatus.

FIG. 9 is a block diagram schematically illustrating a configuration of the client terminal apparatus 105 shown in FIG. 1.

As shown in FIG. 9, the client terminal apparatus 105 includes a client information supplying unit 241, an input unit 242, a requesting unit 243, a transmission unit 244, a reception unit 245, a decoder 246, an image processor 247, and a display unit 248.

The client information supplying unit 241 supplies client information representing processing capability of the client terminal apparatus 105 through the transmission unit 244 to the transcoder 104 which supplies an image.

The input unit 242 includes arbitrary input devices such as a keyboard, a mouse, and a touch panel, an external input terminal, and the like. The input unit 242 accepts a user's instruction input by the user who operates the input devices, control information supplied from other apparatuses, and the like, and supplies the instruction, the control information, and the like to the requesting unit 243.

The requesting unit 243 generates request information used to request an image to be displayed in the display unit 248 in accordance with the instruction supplied from the input unit 242 and supplies the request information through the transmission unit 244 to the transcoder 104.

The transmission unit 244 communicates with the transcoder 104 and transmits the client information and the image request information to the transcoder 104.

The reception unit 245 communicates with the transcoder 104, receives the JPEG encoded data supplied from the transcoder 104, and supplies the JPEG encoded data to the decoder 246.

The decoder 246 decodes the JPEG encoded data supplied through the reception unit 245 in the JPEG method so as to generate baseband image data. The decoder 246 supplies the generated image data to the image processor 247.

The image processor 247 performs image processing such as a filter process on the supplied image data in accordance with values of focus flags so as to generate an image to be displayed. The display unit 248 includes an arbitrary monitor such as a CRT display or an LCD and displays the image in the monitor.

The user who uses the client terminal apparatus 105 observes the image displayed in the display unit 248 and performs a diagnosis.

As described above, the client terminal apparatus 105 obtains the requested image as the JPEG encoded data. Accordingly, the client terminal apparatus 105 may easily receive and decode the encoded data supplied from the transcoder 104 and displays the decoded image.

Furthermore, the client terminal apparatus 105 may more easily request an image to be displayed using a position, a focus position, and a resolution.

Note that, when a band of the transmission path and the processing capability of the client terminal apparatus 105 have margins, the transcoder 104 may supply, in addition to the JPEG encoded data including the requested image, another JPEG encoded data (which is adjacent to the JPEG encoded data in the Z direction, for example) to the client terminal apparatus 105.

For example, it is assumed that the user who uses the client terminal apparatus 105 performs a diagnosis while viewing an observation image of a specimen displayed in the display unit 248. The display unit 248 may display the entire image of the specimen. However, when the user desires to observe the image in detail, the image of the specimen may be enlarged and a portion of the image may be displayed.

The user causes the display unit 248 to display various images by moving a position of a portion of the image of the specimen to be displayed in the display unit 248, by changing a focus position, and by changing a size of the image, for example, so as to observe the specimen.

For example, when different portions in a different focus plane image are to be observed, the user shifts a portion of the focus plane image to be displayed in the display unit 248 in the X and Y directions. Furthermore, when the focus position is to be changed, the user shifts the image to be displayed in the display unit 248 in the Z direction (the focus plane image is changed to another). For example, when a size of the display image is to be changed, that is, scaling of the display image is performed, the user changes a resolution of the image to be displayed in the display unit 248 (to another resolution).

The user may perform such an instruction in any method, but a GUI operation such as scrolling is generally performed. Accordingly, when the user controls the image to be displayed in the display unit 248 as described above, it is highly likely that an image positioned nearest an image which has been currently displayed is displayed next.

For example, it is likely that an image which is located in a region which is adjacent to an image which has been currently displayed and which is included in a focus plane image which also includes the image which has been currently displayed (the same XY plane), an image which is located in a position the same as that of the image which has been currently displayed and which is included in a focus plane image which is adjacent in the Z direction to the focus plane image of the image which has been currently displayed, or an image which has a resolution which is different from that of the image which has been currently displayed and which corresponds to the image which has been currently displayed is displayed next.

The transcoder 104 may supply, in addition to the requested image, JPEG encoded data of an image located near (around) the requested image to the client terminal apparatus 105 in advance.

By this, the client terminal apparatus 105 obtains a next image to be requested before a request is issued, and may perform image display without waiting a response to the request. That is, response speed (image display) to the request may be improved.

In this case, the extraction unit 210 extracts, in addition to 2D-DCT coefficient data including the requested image, another 2D-DCT coefficient data located near the 2D-DCT coefficient data (which is adjacent 2D-DCT coefficient data in the Z direction) and supplies the 2D-DCT coefficient data to the quantization unit 211. The quantization unit 211 to the transmission unit 213 process all the supplied 2D-DCT coefficient data and supply the 2D-DCT coefficient data to the client terminal apparatus 105 as JPEG encoded data.

Flow of 3D-DCT Encoding Process

Various processes executed by the image processing system 100 will now be described. First, referring to FIG. 10, an example of a flow of a 3D-DCT encoding process executed by the 3D-DCT encoder 102 will be described.

When a Z-stack image is supplied from the virtual microscope 101, the 3D-DCT encoder 102 starts the 3D-DCT encoding process. When the 3D-DCT encoding process is started, the encoding parameter setting unit 131 sets encoding parameters in step S101.

In step S102, the correlation processor 132 deletes low-correlation images. In step S103, the encoding parameter setting unit 133 sets focus flags.

In step S104, the 2D-DCT unit 171 performs 2D-DCT on focus plane images included in blocks. In step S105, the 1D-DCT unit 172 performs 1D-DCT in the Z direction on 2D-DCT coefficient data of the blocks generated in step S104.

In step S106, the quantization unit 135 quantizes 3D-DCT coefficient data of the blocks generated in step S105. In step S107, the encoder 136 encodes the 3D-DCT coefficient data of the blocks quantized in step S106.

In step S108, the encoder 136 outputs the 3D-DCT encoding encoded data of the blocks generated in step S107 to the transcoder 104 and the storage 103 stores the 3D-DCT encoded data.

After the process in step S108 is terminated, the 3D-DCT encoder 102 terminates the 3D-DCT encoding process.

Flow of Encoding Parameter Setting Process

Referring now to a flowchart shown in FIG. 11, an example of a flow of the encoding parameter setting process executed in step S101 of FIG. 10 will be described.

When the encoding parameter setting process is started, the image analysis unit 141 analyzes images of blocks to be processed included in the Z-stack image supplied from the virtual microscope 101 in step S121. An arbitrary method may be employed in the analysis depending on a type of analysis.

In step S122, the block-size determination unit 142 determines an appropriate block size in accordance with a result of the analysis performed in step S121.

In step S123, the quantization parameter setting unit 143 determines quantization parameters for the blocks in accordance with the result of the analysis performed in step S121.

After the process in step S123 is terminated, the encoding parameter setting unit 131 terminates the encoding parameter setting process, the process returns to step S101, and the processes in step S102 onwards are executed.

Flow of Correlation Process

Referring now to a flowchart shown in FIG. 12, an example of the correlation process executed in step S102 of FIG. 10 will be described.

When the correlation process is started, the Z-correlation analysis unit 151 analyzes the correlations in the Z direction among the blocks in step S141. An arbitrary method may be employed in this analysis.

In step S142, the low-correlation image deletion unit 152 deletes focus plane images which have the correlations in the Z direction with the other focus plane images which are lower than a predetermined threshold value (considerably low correlations) in the blocks in accordance with a result of the analysis performed in step S141. As described above, this "deletion" means removal (separation) from the original Z-stack image, and a case where extracted focus plane images are separately stored is also included in the "deletion".

After the process in step S142 is terminated, the correlation processor 132 terminates the correlation process, the process returns to step S102 in FIG. 10, and processes in step S103 onwards are executed.

Flow of Focus Flag Setting Process

Figure 13:
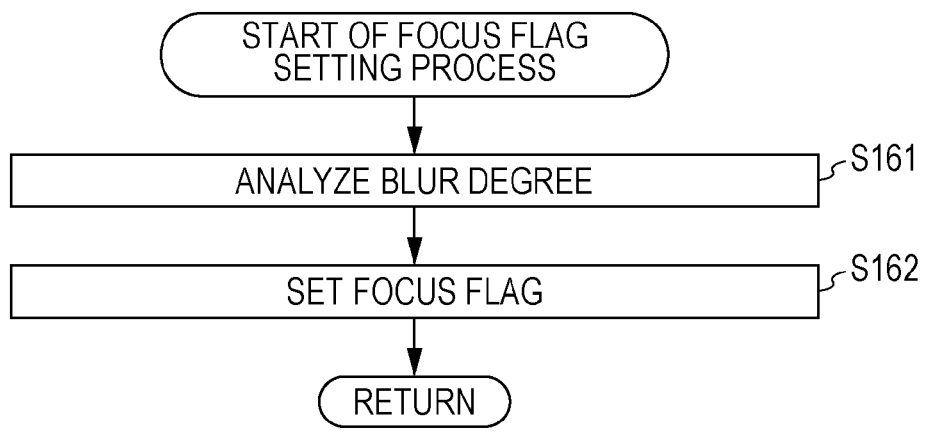
FIG. 13 is a flowchart illustrating a focus flag setting process.

Referring now to a flowchart shown in FIG. 13, an example of a flow of the focus flag setting process executed in step S103 of FIG. 10 will be described.

When the focus flag setting process is started, the focus determination unit 161 analyzes degrees of blurs (sharpness of contours (edge components)) of the focus plane images in the blocks in step S161.

In step S162, the focus flag insertion unit 162 sets values of focus flags representing whether the focus plane images in the blocks are focused in accordance with results of the analysis performed in step S161 and inserts the focus flags in certain positions of the image data. The insertion positions of the focus flags are arbitrarily determined. Furthermore, the focus flags may be stored in the storage 103 as data different from the image data after being associated with the image data, and the focus flags corresponding to the image data (JPEG encoded data) may be supplied to the client terminal apparatus 105 along with the image data.

After the process in step S162 is terminated, the encoding parameter setting unit 133 terminates the focus flag setting process, the process returns to step S103 in FIG. 10, and the processes in step S104 onwards are executed.

Flow of 3D-DCT Encoded Data Storing Process

Figure 14:
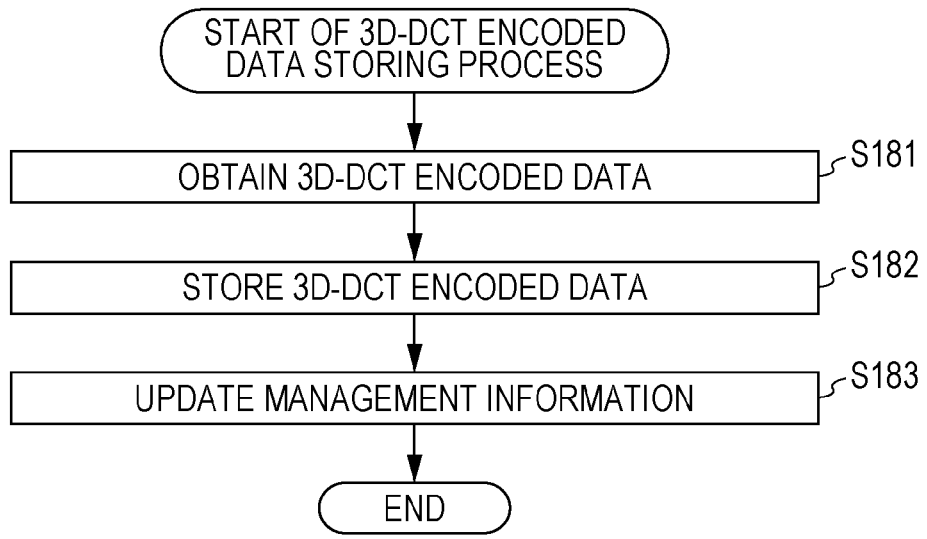
FIG. 14 is a flowchart illustrating a 3D-DCT-encoded-data storing process.

Referring now to a flowchart in FIG. 14, an example of a flow of a 3D-DCT encoded data storing process of storing the 3D-DCT encoded data generated in the 3D-DCT encoding process shown in FIG. 10 in the storage 103 which is executed by the transcoder 104 will be described.

When the 3D-DCT encoded data storing process is started, the 3D-DCT encoded data storage controller 201 included in the transcoder 104 (shown in FIG. 7) obtains the 3D-DCT encoded data from the 3D-DCT encoder 102 in step S181.

In step S182, the 3D-DCT encoded data storage controller 201 supplies the 3D-DCT encoded data obtained in step S181 to the storage 103 which stores the 3D-DEC encoded data.

In step S183, the 3D-DCT encoded data storage controller 201 updates management information of the storage 103 so that a fact that the 3D-DCT encoded data is newly stored in step S182 is reflected in the management information.

When the process in step S183 is terminated, the 3D-DCT encoded data storage controller 201 terminates the 3D-DCT encoded data storing process.

Flow of Image Supplying/Displaying Process

Referring now to a flowchart shown in FIG. 15, an example of a flow of an image supplying/displaying process which is executed by the transcoder 104 and the client terminal apparatus 105 which are communicated with each other so that an image stored in the storage 103 is supplied to the client terminal apparatus 105 which displays the image will be described.

When the image supplying/displaying process is started, the client information supplying unit 241 included in the client terminal apparatus 105 (shown in FIG. 9) supplies client information through the transmission unit 244 to the transcoder 104 in step S201.

In response to this process, the transmission information obtaining unit 202 included in the transcoder 104 (shown in FIG. 7) obtains transmission information including the client information in step S221.

In step S222, the encoding parameter controller 203 controls encoding parameters in accordance with the transmission information obtained in step S221 so that the encoding parameters become appropriate values.

In step S202, the input unit 242 included in the client terminal apparatus 105 accepts an instruction for displaying an image input by the user. When the instruction is input, the requesting unit 243 specifies a position, a layer (focus position), a size (resolution), and the like of the image to be requested in accordance with the instruction, and requests data corresponding to the image to the transcoder 104 through the transmission unit 244 in step S203.

The request reception unit 204 of the transcoder 104 receives the request in step S223.

In step S224, the data specifying unit 205 specifies data to be transmitted to the client terminal apparatus 105 in a unit of a block in accordance with the request obtained in step S223.

Note that it is assumed that a block size of a focus plane (XY plane) of the 3D-DCT encoded data is 8×8 (DCT_SIZE_X=DCT_SIZE_Y=8) in the following description.

In step S225, the 3D-DCT encoded data reading unit 206 reads the 3D-DCT encoded data for individual blocks which include the data to be transmitted from the storage 103.

In step S226, the decoder 207 decodes the 3D-DCT encoded data of the blocks which are read in step S225. In step S227, the inverse quantization unit 208 performs inverse quantization on the quantized 3D-DCT efficient data of the blocks which are generated by the process in step S226. In step S228, the 1D-IDCT unit 209 performs 1D-IDCT on the 3D-DCT coefficient data of the blocks obtained through the process in step S227.

In step S229, the extraction unit 210 extracts 2D-DCT coefficient data to be transmitted from among 2D-DCT coefficient data generated through the process in step S228.

In step S230, the quantization unit 211 quantizes the extracted 2D-DCT coefficient data of the blocks which is extracted in step S229 using the quantization parameters set by the encoding parameter controller 203. In step S231, the encoder 212 encodes the 2D-DCT coefficient data of the blocks which is quantized through the process in step S230 using the encoding parameters set by the encoding parameter controller 203. In step S232, the transmission unit 213 transmits JPEG encoded data generated in step S231 to the client terminal apparatus 105 under control of the encoding parameter controller 203.

The reception unit 245 included in the client terminal apparatus 105 receives the JPEG encoded data in step S204. In step S205, the decoder 246 decodes the JPEG encoded data received in step S204 so as to generate baseband image data.

In step S206, the image processor 247 performs image processing on image data obtained by decoding the JPEG encoded data in step S205. In step S207, the display unit 248 displays an image obtained through the image processing.

Flow of Image Processing

Referring now to a flowchart shown in FIG. 16, an example of a flow of the image processing performed in step S206 of FIG. 15 will be described.

When the image processing is started, the image processor 247 checks the values of the focus flags in step S241. In step S242, the image processor 247 determines whether the decoded image is focused in accordance with the values of the flags and sets filter coefficients in accordance with the determination as to whether the decoded image is focused.

In step S243, the image processor 247 performs a filter process on the decoded image using the filter coefficients set in step S242.

Figure 15:
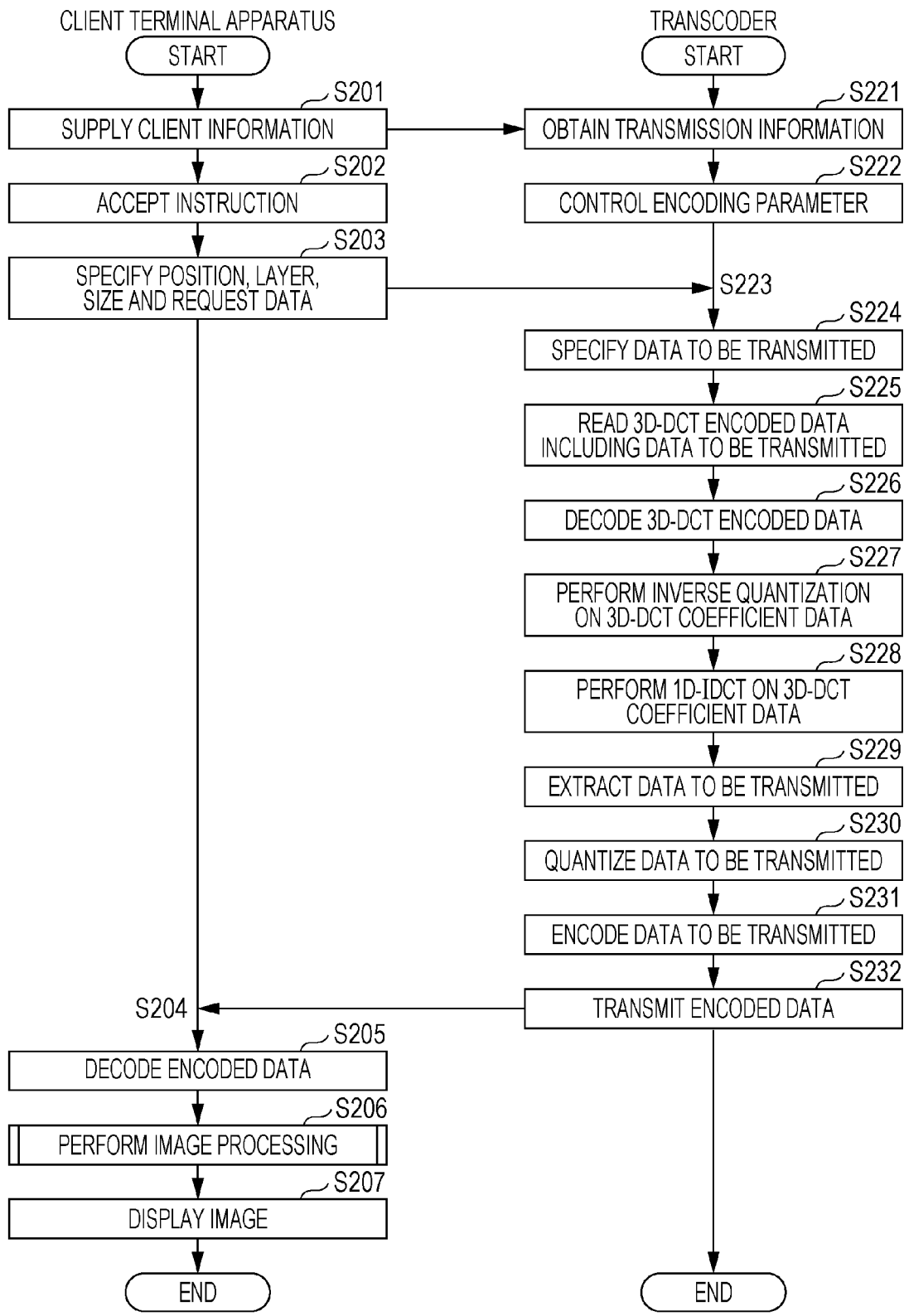
FIG. 15 is a flowchart illustrating an image supplying/displaying process.
Figure 16:
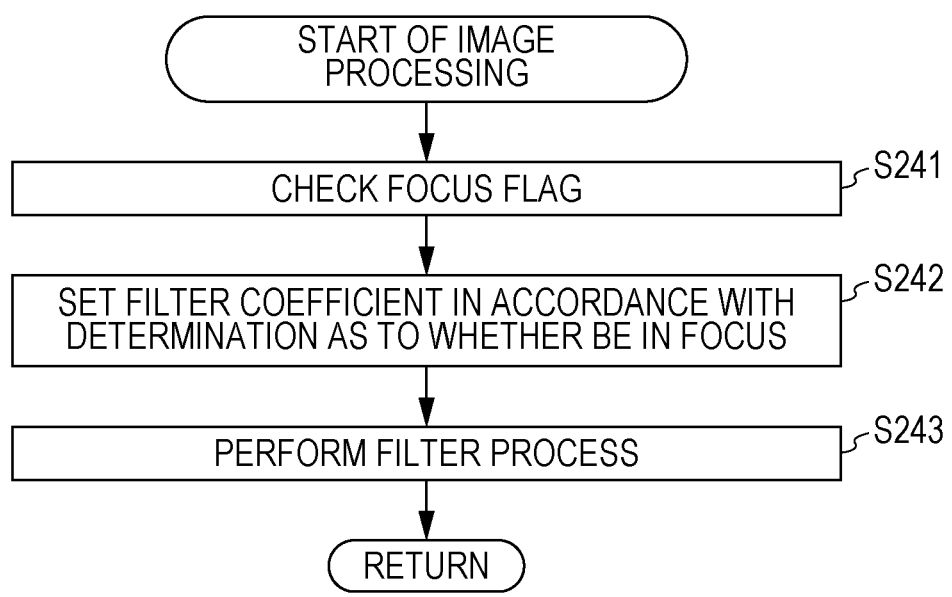
FIG. 16 is a flowchart illustrating an image process.

When the process in step S243 is terminated, the image processor 247 terminates the image processing, the process returns to step S206 in FIG. 15, and the processes in step S207 onwards are executed.

Note that the image processing performed in accordance with the values of the focus flags may be arbitrarily determined and a process other than the filter process may be employed.

As described above, since the various devices included in the image processing system 100 perform the various processes described above, capacity used for storing encoded data obtained by encoding an image may be reduced while usability of the image is prevented from being deteriorated.

In the foregoing description, the case where the block sizes of the XY plane of the 3D-DCT encoded data (sizes in a unit of 2D orthogonal transform process (2D-DCT) performed on the XY plane) are 8×8 has been described. However, the block sizes are arbitrarily determined and block sizes other than the block sizes of 8×8 may be employed.

Figure 17:
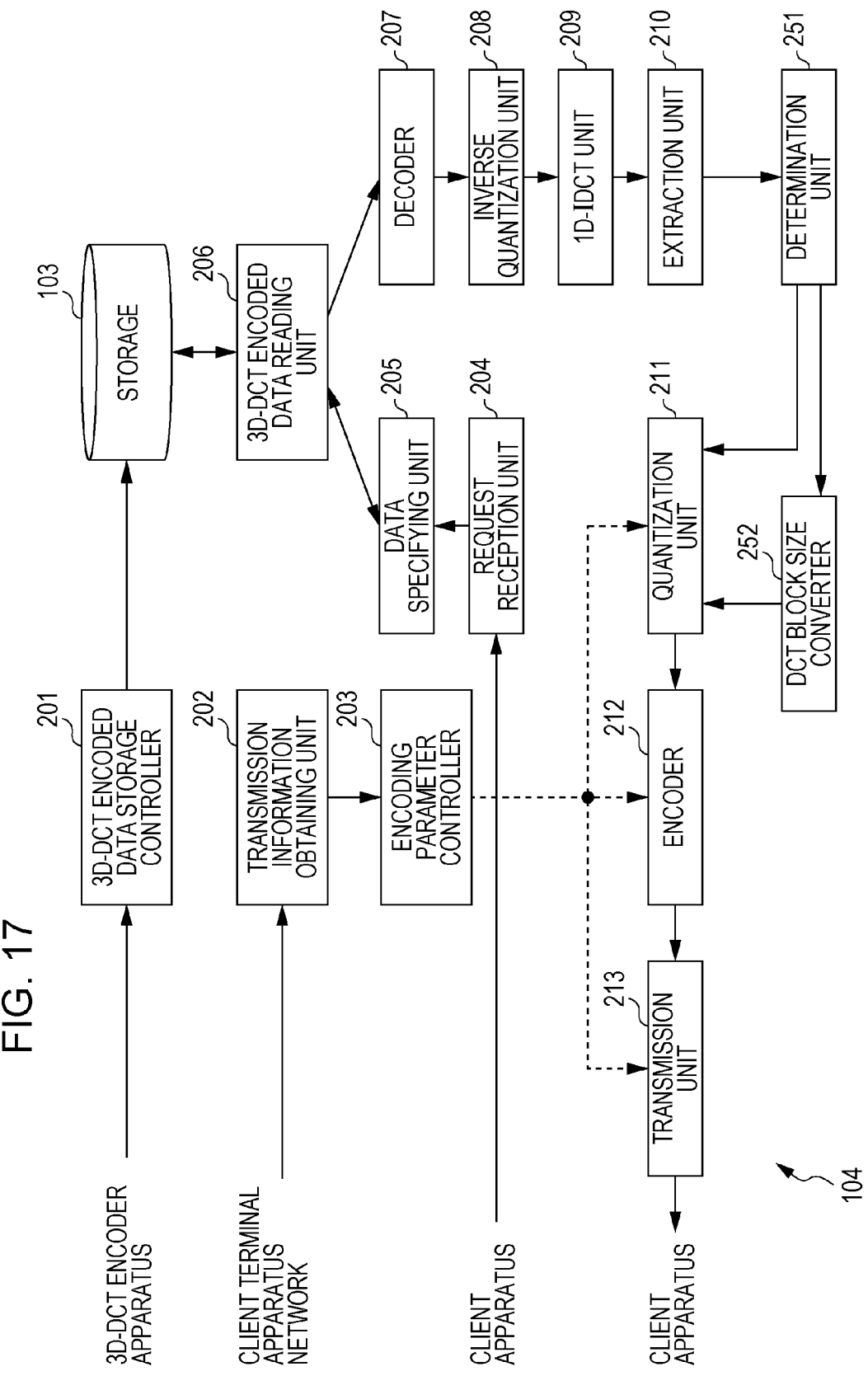
FIG. 17 is a block diagram schematically illustrating another configuration of the transcoder.

FIG. 17 is a block diagram schematically illustrating a configuration of the transcoder 104 in this case. In the case of an example shown in FIG. 17, the transcoder 104 may convert arbitrary block sizes which are larger than block sizes of 8×8 into the block sizes of 8×8 which conform to the JPEG standard.

In this case, the transcoder 104 includes, in addition to the configuration of the example shown in FIG. 7, a determination unit 251 and a DCT block size converter 252. An output of the extraction unit 210 is supplied to the determination unit 251, and an output from the determination unit 251 is supplied to the quantization unit 211 or the DCT block size converter 252. An output from the DCT block size converter 252 is supplied to the quantization unit 211.

The determination unit 251 determines whether block sizes of the 2D-DCT coefficient data of the blocks which is extracted by the extraction unit 210 is 8×8 (DCT_SIZE_X=DCT_SIZE_Y=8) which conforms to the JPEG standard.

When it is determined that the block sizes is 8×8 (DCT_SIZE_X=DCT_SIZE_Y=8), the determination unit 251 supplies the 2D-DCT coefficient data of the blocks which is supplied from the extraction unit 210 to the quantization unit 211. That is, in this case, conversion of the block sizes which will be described below is omitted, and a quantization process is performed on the 2D-DCT coefficient data of the blocks which is extracted by the extraction unit 210.

On the other hand, when it is determined that the block sizes are not 8×8 (at least one of DCT_SIZE_X and DCT_SIZE_Y is larger than 8), the determination unit 251 supplies the 2D-DCT coefficient data of the blocks which is supplied from the extraction unit 210 to the DCT block size converter 252. That is, in this case, the 2D-DCT coefficient data of the blocks which is extracted by the extraction unit 210 is quantized after the block sizes of the 2D-DCT coefficient data are converted as described below.

The DCT block size converter 252 changes the current block sizes to the block sizes of 8×8 by multiplying the 2D-DCT coefficient data of the blocks by a certain coefficient matrix corresponding to the block sizes.

As shown in an upper portion in FIG. 18, when an image (image matrix X) of 16 pixels×16 pixels is multiplied by a coefficient matrix $A_1$ from the left side and a coefficient matrix $B_1$ from the right side in a pixel space, the matrices $A_1$ and $B_1$ being shown in an upper right portion in FIG. 18, a pixel matrix Y of 8 pixels×8 pixels (a portion represented by a number "1") in an upper left portion of the original pixel matrix X is extracted.

Therefore, as shown in a lower portion in FIG. 18, by similarly performing the calculation in a frequency space, a coefficient matrix of 16×16 may be converted into a coefficient matrix of 8×8. Specifically, when a coefficient matrix X' of 16×16 (=$DCT_{16\times16}$(X)) obtained by performing 2D-DCT on the pixel matrix X of 16 pixels×16 pixels shown in the upper portion in FIG. 18 is multiplied by a coefficient matrix A1' (=$DCT_{16\times8}(A_1)$) obtained by performing the 2D-DCT on the coefficient matrix $A_1$ from the left side and a coefficient matrix B1' (=$DCT_{8\times16}(B_1)$) obtained by performing the 2D-DCT on the coefficient matrix $B_1$ from the right side, a coefficient matrix Y' (=$DCT_{8\times8}$(Y)) obtained by performing the 2D-DCT on the pixel matrix Y of 8 pixels×8 pixels located in the upper left portion in the original pixel matrix X (the portion represented by the number "1") is obtained.

Note that coefficient matrices to multiply the 2D-DCT coefficient data of the blocks in order to change the block sizes are different depending on the block sizes. The DCT block size converter 252 may easily convert the current block sizes into the block sizes of 8×8 by multiplying the 2D-DCT coefficient data of the blocks by coefficient matrices employed depending on the block sizes.

The DCT block size converter 252 supplies the 2D-DCT coefficient data in which the block sizes have been converted to the quantization unit 211.

The quantization unit 211 quantizes the 2D-DCT coefficient data of the blocks supplied from the determination unit 251 or the DCT block size converter 252 under control of the encoding parameter controller 203 and supplies the quantized 2D-DCT coefficient data of the blocks to the encoder 212.

Processes of the other units are the same as those described with reference to FIG. 7, and therefore, descriptions thereof are omitted.

As described above, the transcoder 104 may convert the current block sizes of the 2D-DCT coefficient data into the block sizes of 8×8 which conform to the JPEG standard in the frequency space. Specifically, the transcoder 104 may change the block sizes without returning the 2D-DCT coefficient data to the baseband. That is, the transcoder 104 may easily change the block sizes at high speed. Accordingly, even when block sizes in the XY plane direction of 3D-DCT encoded data is not 8×8, the transcoder 104 may easily supply desired JPEG encoded data to the client terminal apparatus 105 at high speed.

Referring to FIG. 19, an example of a flow of the image supplying/displaying process in this case will be described. Also in this case, processes in the image supplying/displaying process are basically performed similarly to the case described with reference to the flowchart shown in FIG. 15. However, in the case of the example shown in FIG. 19, after a process in step S229 is terminated, the process proceeds to step S251.

In step S251, the determination unit 251 determines whether block sizes of 2D-DCT coefficient data of blocks which is extracted in step S229 are 8×8 (that is, whether DCT_SIZE_X=8 and DCT_SIZE_Y=8 are satisfied). When it is determined that at least one of DCT_SIZE_X and DCT_SIZE_Y is larger than "8", the determination unit 251 proceeds to step S252.

In step S252, the DCT block size converter 252 converts the block sizes of the 2D-DCT coefficient data of the blocks which is extracted in step S229 into block sizes of 8×8 which conform to the JPEG standard. After the process in step S252 is terminated, the DCT block size converter 252 returns to step S230 and the processes in step S230 onwards are executed.

Furthermore, when it is determined that the expression "DCT_SIZE_X=DCT_SIZE_Y=8" is satisfied in step S251, the block size conversion process in step S252 is omitted. That is, in this case, the determination unit 251 returns the process to step S230 and the processes in step S230 onwards are executed.

As described above, in this case, the transcoder 104 may convert block sizes where appropriate in the frequency space even when block sizes in an XY plane direction of 3D-DCT coefficient data stored in the storage 103 is not 8×8 so as to generate 2D-DCT encoded data having block sizes conforming to the JPEG standard and supply the 2D-DCT encoded data to the client terminal apparatus 105. Specifically, the transcoder 104 may easily supply desired JPEG encoded data at high speed to the client terminal apparatus 105 even when the block sizes in the XY plane direction of the 3D-DCT encoded data is not 8×8.

Note that the conversion of the block sizes may not be performed in the frequency space. For example, in order to convert the block sizes, the transcoder 104 may change the 3D-DCT encoded data to the baseband.

Figure 20:
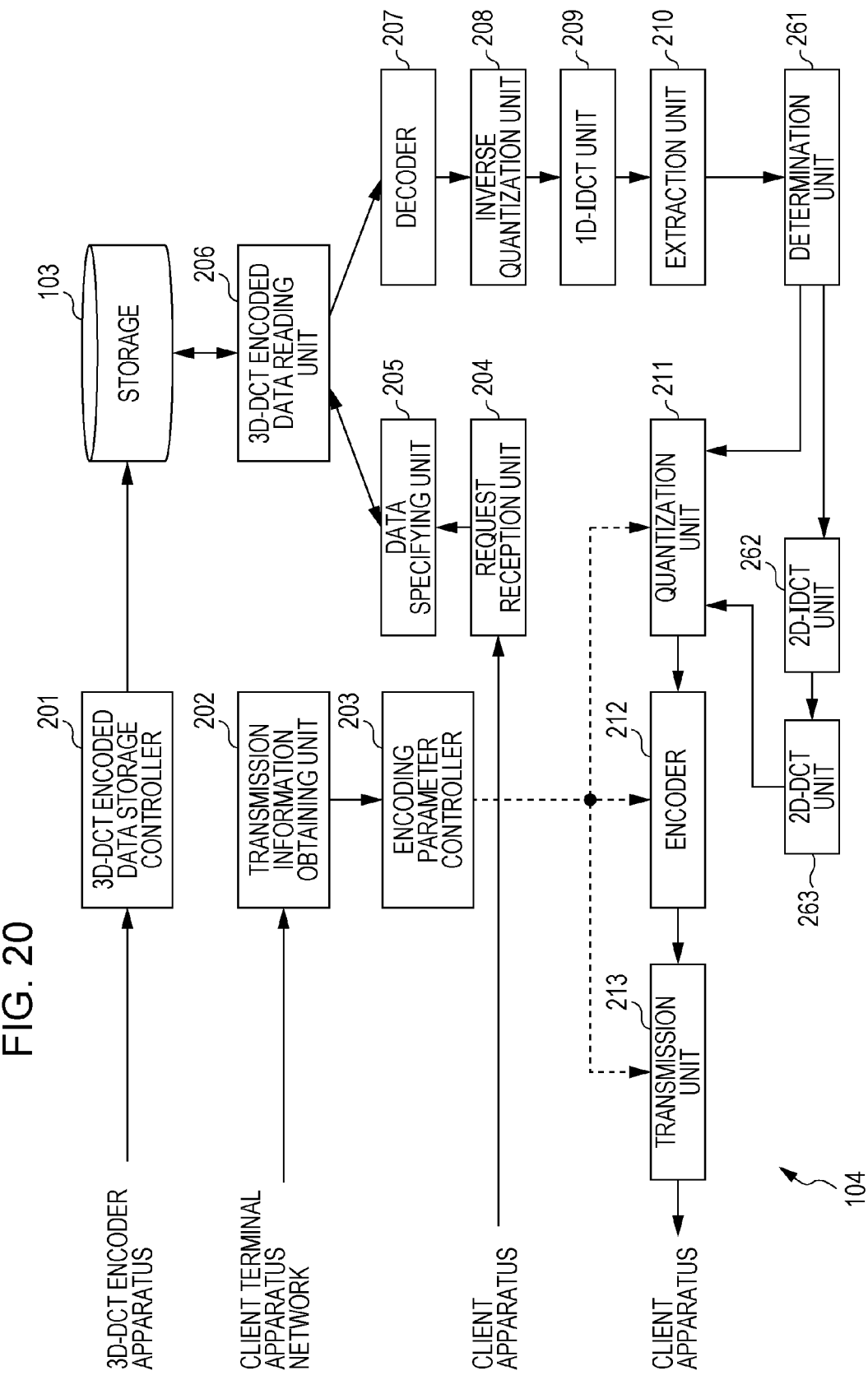
FIG. 20 is a block diagram schematically illustrating a further configuration of the transcoder.

FIG. 20 is a block diagram schematically illustrating a configuration of the transcoder 104 in this case. In the case of the example shown in FIG. 20, as with the example shown in FIG. 17, the transcoder 104 may convert arbitrary block sizes into the block sizes of 8×8 which conform to the JPEG standard.

The transcoder 104 in the case of the example shown in FIG. 20 includes, in addition to the configuration in the case of the example shown in FIG. 7, a determination unit 261, a 2D-IDCT unit 262, and a 2D-DCT unit 263. An output from the extraction unit 210 is supplied to the determination unit 261, and an output from the determination unit 261 is supplied to the quantization unit 211 or the 2D-IDCT unit 262. An output of the 2D-IDCT unit 262 is supplied to the 2D-DCT unit 263. An output of the 2D-DCT unit 263 is supplied to the quantization unit 211.

As with the determination unit 251, the determination unit 261 determines whether block sizes of 2D-DCT coefficient data of blocks which is extracted by the extraction unit 210 are block sizes of 8×8 (DCT_SIZE_X=DCT_SIZE_Y=8) which conform to the JPEG standard.

When it is determined that the block sizes is 8×8 (DCT_SIZE_X=DCT_SIZE_Y=8), the determination unit 261 supplies the 2D-DCT coefficient data of the blocks which is supplied from the extraction unit 210 to the quantization unit 211. That is, in this case, conversion of the block sizes which will be described below is omitted, and a quantization process is performed on the 2D-DCT coefficient data of the blocks which is extracted by the extraction unit 210.

On the other hand, when it is determined that the block sizes are not 8×8 (at least one of DCT_SIZE_X and DCT_SIZE_Y is not 8), the determination unit 261 supplies the 2D-DCT coefficient data of the blocks which is supplied from the extraction unit 210 to the 2D-IDCT unit 262. That is, in this case, the 2D-DCT coefficient data of the blocks which is extracted by the extraction unit 210 is quantized after the block sizes of the 2D-DCT coefficient data are converted as described below.

The 2D-IDCT unit 262 performs two-dimensional inverse orthogonal transform (2D-IDCT) on the 2D-DCT coefficient data of the blocks which is supplied from the determination unit 261 so as to obtain baseband image data.

The 2D-DCT unit 263 performs two-dimensional orthogonal transform (2D-DCT) supplied from the 2D-IDCT unit 262 for each matrix of 8 pixels×8 pixels which conforms to the JPEG standard. Note that, when block sizes of at least one of the X and Y directions of the 3D-DCT encoded data stored in the storage 103 are smaller than the block sizes of 8×8, the 2D-DCT unit 263 stores the baseband image data supplied from the 2D-IDCT unit 262 until data corresponding to the matrix of 8 pixels×8 pixels which conforms to the JPEG standard is obtained. When the data corresponding to the matrix of 8 pixels×8 pixels is obtained, the 2D-DCT unit 263 performs two-dimensional orthogonal transform on the data of 8 pixels×8 pixels.

The 2D-DCT unit 263 supplies the 2D-DCT coefficient data (of the blocks) of the matrix of 8 pixels×8 pixels (which conforms with the JPEG standard) which has been obtained through the orthogonal transform as described above to the quantization unit 211.

The quantization unit 211 quantizes the 2D-DCT coefficient data of the blocks supplied from the determination unit 261 or the 2D-DCT unit 263 under control of the encoding parameter controller 203 and supplies the quantized 2D-DCT coefficient data of the blocks to the encoder 212.

Processes performed by the other units are the same as those described with reference to FIG. 7, and therefore, descriptions thereof are omitted.

As described above, the transcoder 104 may convert the current block sizes into the block sizes of 8×8 which conform with the JPEG standard by returning the 2D-DCT coefficient data to the pixel space. Note that, also in this case, the transcoder 104 may extract data to be used by the extraction unit 210 and perform a block-size conversion process only on the extracted data. That is, unused data which is not supplied to the client terminal apparatus 105 may not be processed (may not be returned to the baseband).

Therefore, the transcoder 104 may easily change the block sizes at high speed. Accordingly, even when block sizes in an XY plane direction of 3D-DCT encoded data is not 8×8, the transcoder 104 may easily supply desired JPEG encoded data to the client terminal apparatus 105 at high speed.

Figure 21:
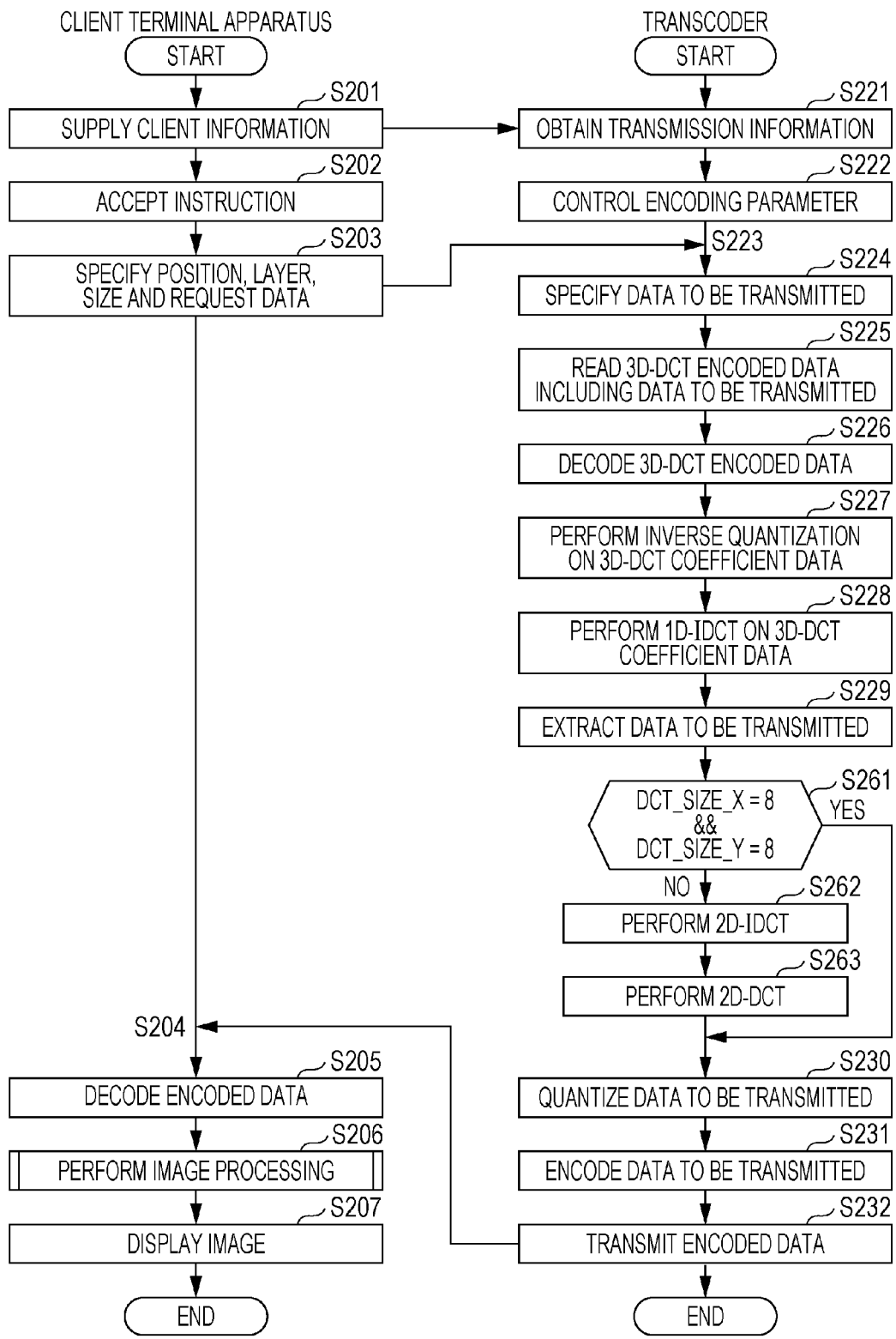
FIG. 21 is a flowchart illustrating a further image supplying/displaying process.

Referring to a flowchart shown in FIG. 21, an example of a flow of the image supplying/displaying process in this case will be described. Also in this case, processes in the image supplying/displaying process are basically performed similarly to the case described with reference to the flowchart shown in FIG. 15. However, in the case of the example shown in FIG. 21, after a process in step S229 is terminated, the process proceeds to step S261.

In step S261, the determination unit 261 determines whether block sizes of 2D-DCT coefficient data of blocks which is extracted in step S229 are 8×8 (that is, whether DCT_SIZE_X=8 and DCT_SIZE_Y=8 are satisfied). When it is determined that at least one of DCT_SIZE_X and DCT_SIZE_Y is not "8", the determination unit 261 proceeds to step S262.

The 2D-IDCT unit 262 performs two-dimensional inverse orthogonal transform (2D-IDCT) on 2D-DCT coefficient data of blocks which is extracted in step S229 so as to obtain baseband image data.

In step S263, the 2D-DCT unit 263 performs two-dimensional orthogonal transform (2D-DCT) on the baseband image data obtained through the process in step S262 for each matrix of 8 pixels×8 pixels (block sizes of 8×8) which conforms to the JPEG standard so as to obtain 2D-DCT coefficient data for each block. That is, the 2D-DCT coefficient data is obtained for each block having the block size of 8×8 through this process. After the process in step S263 is terminated, the 2D-DCT unit 263 returns the process to step S230 and the processes in step S230 onwards are executed.

Furthermore, in step S261, it is determined that the expression "DCT_SIZE_X=DCT_SIZE_Y=8" is satisfied, the block size conversion process in step S262 and step S263 is omitted. That is, in this case, the determination unit 261 returns the process to step S230 and processes in step S230 onwards are executed.

As described above, in this case, the transcoder 104 appropriately converts only block sizes of data to be used even when block sizes in an XY plane direction of 3D-DCT coefficient data stored in the storage 103 is not 8×8 so as to generate 2D-DCT encoded data having block sizes conforming to the JPEG standard and supply the 2D-DCT encoded data to the client terminal apparatus 105. Specifically, the transcoder 104 may easily supply desired JPEG encoded data at high speed to the client terminal apparatus 105 even when the block sizes in the XY plane direction of the 3D-DCT encoded data is not 8×8.

Note that block sizes of encoded data which is output by the transcoder 104 (and supplied to the client terminal apparatus 105) may be arbitrary determined. That is, as an encoding method for image data used when the data is supplied to the client terminal apparatus 105, the arbitrary encoding method other than the JPEG method may be used. Examples of the other arbitrary encoding method include MPEG2 (Moving Picture Experts Group 2), AVC (Advanced Video Coding), and HEVC (High Efficiency Video Coding).

Furthermore, although the case where the discrete cosine transform process is performed on the image data has been described in the foregoing description, the present disclosure is not limited to this and other arbitrary orthogonal transform process including wavelet transform may be performed.

For example, the transcoder 104 may convert image data into JPEG 2000 encoded data and supply the data to the client terminal apparatus 105. When the JPEG 2000 encoding method is used, arbitrary block sizes are employed. Therefore, the block-size conversion process described above is omitted.

Furthermore, an order of the inverse orthogonal transform process (an order of the inverse orthogonal transform process performed in the X, Y, and Z directions) does not depend on an order of the orthogonal transform process (an order of the orthogonal transform process performed in the X, Y, and Z directions). That is, the order of the orthogonal transform process (the order of the orthogonal transform process in the X, Y, and Z directions) performed by the 3D-DCT unit 134 included in the 3D-DCT encoder 102 is arbitrarily determined.

Furthermore, although the focus plane corresponds to the XY plane and the direction of the focal length corresponds to the Z direction in the foregoing description, the X, Y, and Z directions may be arbitrarily determined as long as the X, Y, and Z directions orthogonally intersect with one another. For example, the direction of the focal length may correspond to the X or Y direction.

However, a direction of the inversion orthogonal conversion process performed by the 1D-IDCT unit 209 included in the transcoder 104 is orthogonal to a desired plane (supplied to the client terminal apparatus 105).

2. Second Embodiment
Configuration of Image Processing System

Figure 22:
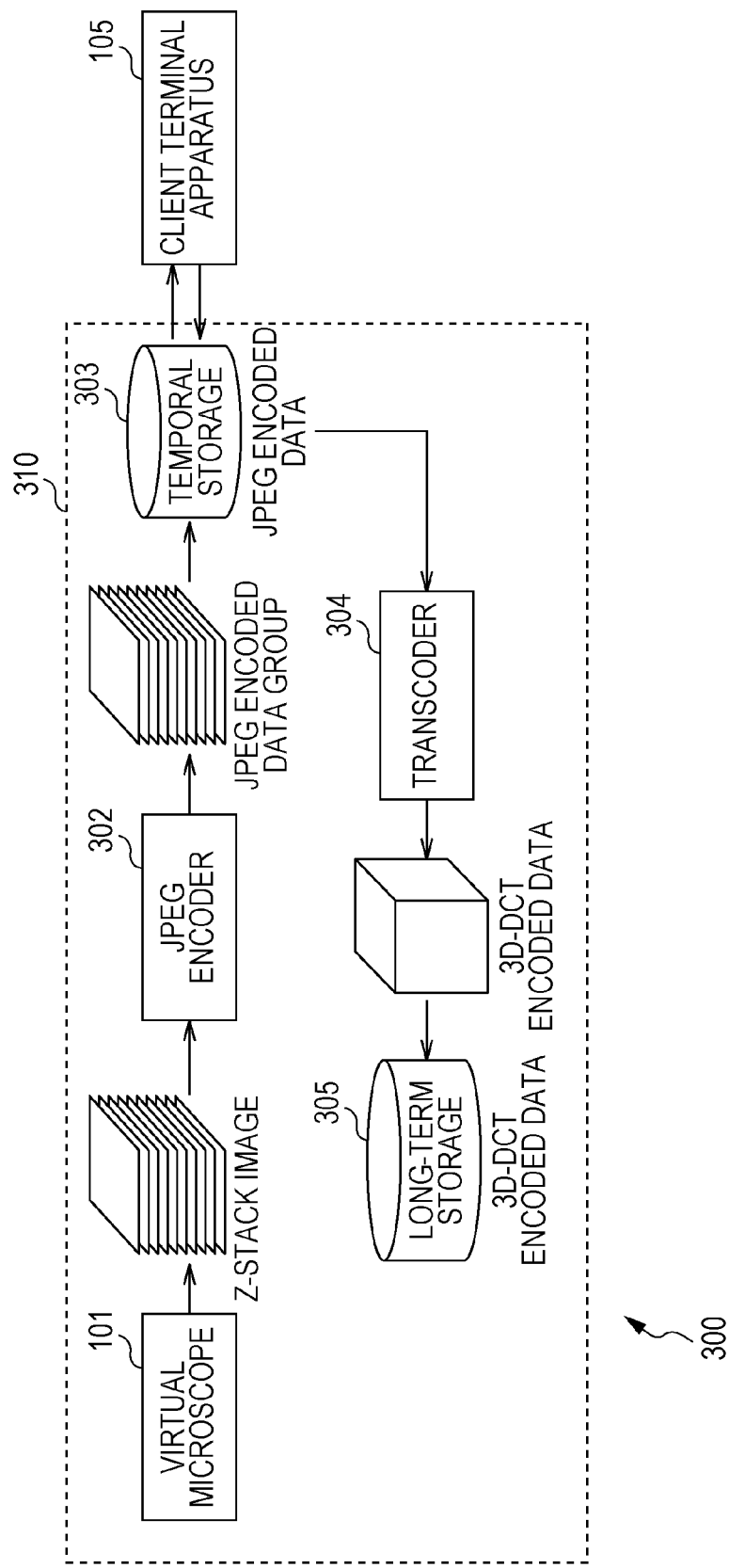
FIG. 22 is a block diagram schematically illustrating a configuration of an image processing system according to a second embodiment of the present disclosure.

FIG. 22 is a block diagram schematically illustrating a configuration of an image processing system according to a second embodiment of the present disclosure. As with the image processing system 100 shown in FIG. 1, an image processing system 300 shown in FIG. 22 which is used for cytoscreening, a tissue diagnosis, and the like captures a specimen using a virtual microscope 101, and an image of the specimen is observed using a client terminal apparatus 105.

Note that, in the image processing system 300, a Z-stack image obtained by the virtual microscope 101 is encoded in the JPEG method and is temporarily stored, and resultant JPEG encoded data is appropriately read and decoded for the observation. Then, after the observation, if the image is not to be referred to for a certain period of time, the JPEG encoded data is converted in a 3D-DCT encoding method into 3D-DCT encoded data to be stored in a middle and long term (archived).

Specifically, although 3D-DCT encoded data is converted into JPEG encoded data in the image processing system 100, conversely, JPEG encoded data is converted into 3D-DCT encoded data in the image processing system 300.

As shown in FIG. 22, the image processing system 300 includes the virtual microscope 101, a JPEG encoder 302, a temporal storage 303, a transcoder 304, a long-term storage 305, and the client terminal apparatus 105.

The JPEG encoder 302 performs JPEG encoding on focus plane images of a Z-stack image generated by the virtual microscope 101 so as to generate a JPEG encoded data group. The JPEG encoder 302 supplies the generated JPEG encoded data group to the temporal storage 303 which stores the JPEG encoded data.

The temporal storage 303 including an arbitrary storage medium temporarily stores the JPEG encoded data obtained by encoding the focus plane images of the Z-stack image in the JPEG method. The temporal storage 303 supplies the JPEG encoded data to the client terminal apparatus 105 in response to a request from the client terminal apparatus 105.

The observation of the specimen is generally performed within a comparatively short period of time after the Z-stack image of the specimen is generated by the virtual microscope 101. Then, while the specimen is observed, in general, the image is frequently requested by the client terminal apparatus 105. Note that the number of specimens which are simultaneously observed is comparatively small.

Accordingly, the Z-stack image is stored in the temporal storage 303 as the JPEG encoded data which is easily supplied to the client terminal apparatus 105 (that is, which is not subjected to the conversion process and supplied at high speed to the client terminal apparatus 105) even if encoding efficiency (compression rate) is not excellent.

Note that the temporal storage 303 preferably performs reading and writing at higher speed even if the temporal storage 303 has a comparatively small storage capacity.

Specifically, when the observation is performed in the image processing system 300, JPEG encoded data is directly supplied from the temporal storage which enables high-speed reading to the client terminal apparatus 105 without being subjected to a conversion process.

After the observation of the specimen is terminated, the image of the specimen is not frequently referred to. However, the image data should be stored in a long term such as five years.

When the long-term storage is performed, the image of the specimen is merely read. However, many images of the specimen should be stored. Therefore, encoding efficiency (compression rate) and capacity of a storage region become more important than the speed of the reading and writing.

The transcoder 304 reads the JPEG encoded data to be stored in a long term from the temporal storage in order to improve the encoding efficiency and converts the JPEG encoded data into 3D-DCT encoded data.

The transcoder 304 supplies the generated 3D-DCT encoded data to the long-term storage 305 which stores the 3D-DCT encoded data.

The long-term storage 305 including an arbitrary storage medium stores the 3D-DCT encoded data supplied from the transcoder 304 in a medium to long term. Reading and writing speed of the long-term storage 305 may be slower than those of the temporal storage 303. However, storage capacity of the long-term storage 305 is preferably larger than that of the temporal storage 303.

Furthermore, the encoding efficiency (compression rate) of the 3D-DCT encoded data is higher than that of the JPEG encoded data group corresponding to the 3D-DCT encoded data.

Accordingly, the long-term storage 305 may store a number of images of the specimen larger than those of the temporal storage 303.

Note that, the virtual microscope 101, the JPEG encoder 302, the temporal storage 303, the transcoder 304, and the long-term storage 305 included in a dotted frame 310 shown in FIG. 22 may be arbitrarily combined with one another. For example, all the devices included in the dotted frame 310 may be configured as a single device (such as a server which supplies an image to the client terminal apparatus 105).

Configuration of JPEG Encoder

Figure 23:
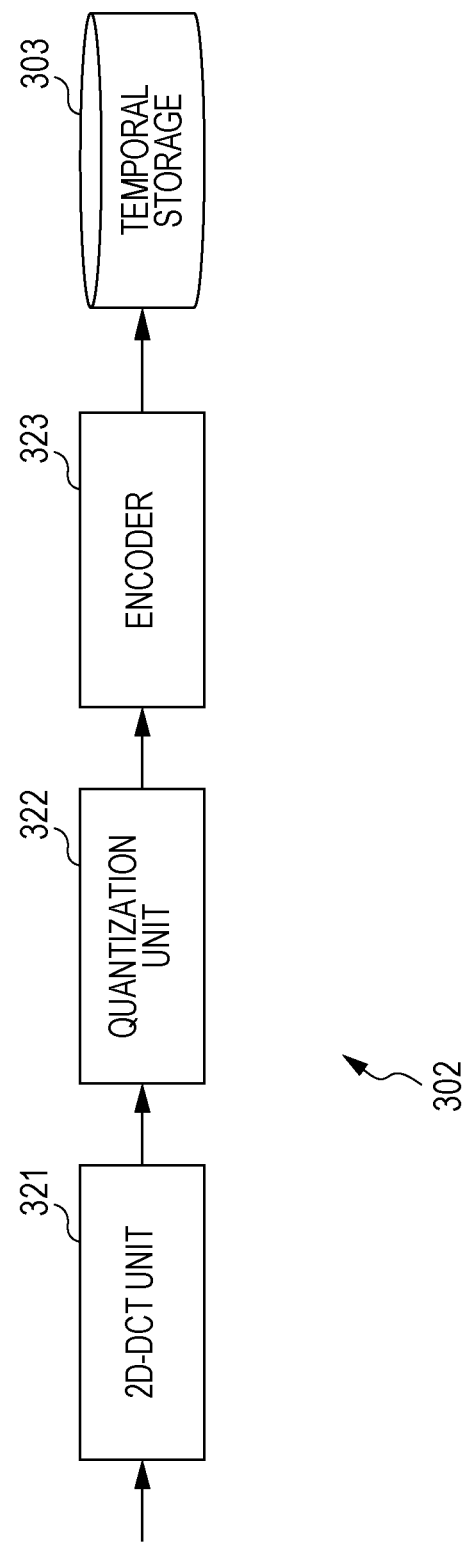
FIG. 23 is a block diagram schematically illustrating a configuration of a JPEG encoder.

FIG. 23 is a block diagram schematically illustrating a configuration of the client terminal apparatus 302 shown in FIG. 22. As shown in FIG. 23, the JPEG encoder 302 includes a 2D-DCT unit 321, a quantization unit 322, and an encoder 323.

The 2D-DCT unit 321 performs a two-dimensional discrete cosine transform process on the focus plane images of the Z-stack image so as to generate 2D-DCT coefficient data for each block. The quantization unit 322 quantizes the 2D-DCT coefficient data of the blocks which is generated by the 2D-DCT unit 321. The encoder 323 performs the run-length Huffman encoding on the 2D-DCT coefficient data of the blocks which is quantized by the quantization unit 322 so as to generate JPEG encoded data for each block. The encoder 323 supplies the generated JPEG encoded data of the blocks to the temporal storage 303 which stores the JPEG encoded data.

Configuration of Transcoder

Figure 24:
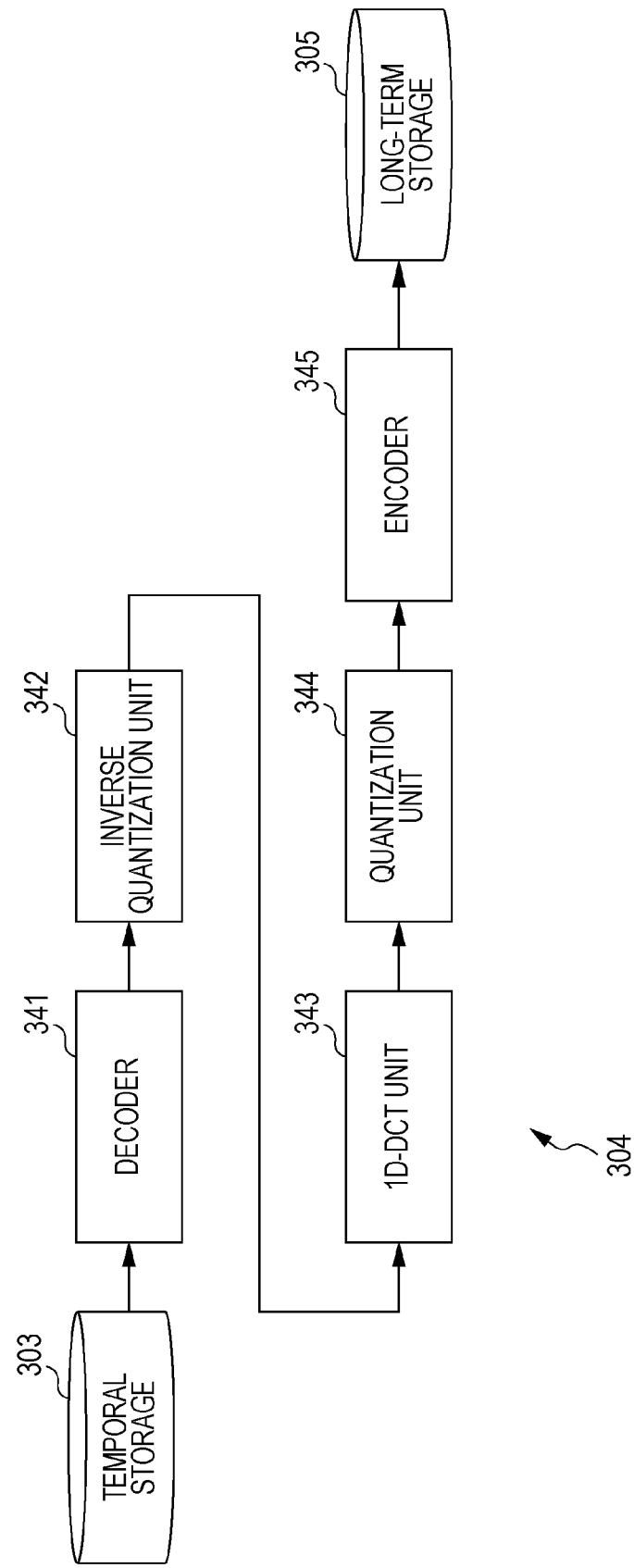
FIG. 24 is a block diagram schematically illustrating a configuration of a transcoder.

FIG. 24 is a block diagram schematically illustrating a configuration of the transcoder 304 shown in FIG. 22.

In FIG. 24, the transcoder 304 includes a decoder 341, an inverse quantization unit 342, an 1D-DCT unit 343, a quantization unit 344, and an encoder 345.

The decoder 341 reads the JPEG encoded data of the blocks from the temporal storage 303 and performs the run-length Huffman decoding to obtain quantized 2D-DCT coefficient data of the blocks to be supplied to the inverse quantization unit 342.

The inverse quantization unit 342 performs inverse quantization on the quantized 2D-DCT coefficient data of the blocks which is supplied from the decoder 341 and supplies obtained resultant 2D-DCT coefficient data of the blocks to the 1D-DCT unit 343.

The 1D-DCT unit 343 performs 1D-DCT in the Z direction on the 2D-DCT coefficient data of the blocks which has been subjected to the inverse quantization performed by the inverse quantization unit 342 and supplies obtained resultant 3D-DCT coefficient of the blocks data to the quantization unit 344. The quantization unit 344 quantizes the supplied 3D-DCT coefficient data of the blocks which is to be supplied to the encoder 345.

The encoder 345 performs the run-length Huffman encoding on the quantized 3D-DCT coefficient data of the blocks so as to generate 3D-DCT encoded data of the blocks. The encoder 345 supplies the generated 3D-DCT encoded data of the blocks to the long-term storage 305 which stores the 3D-DCT encoded data.

Flow of Temporal Storage Process

Figure 25:
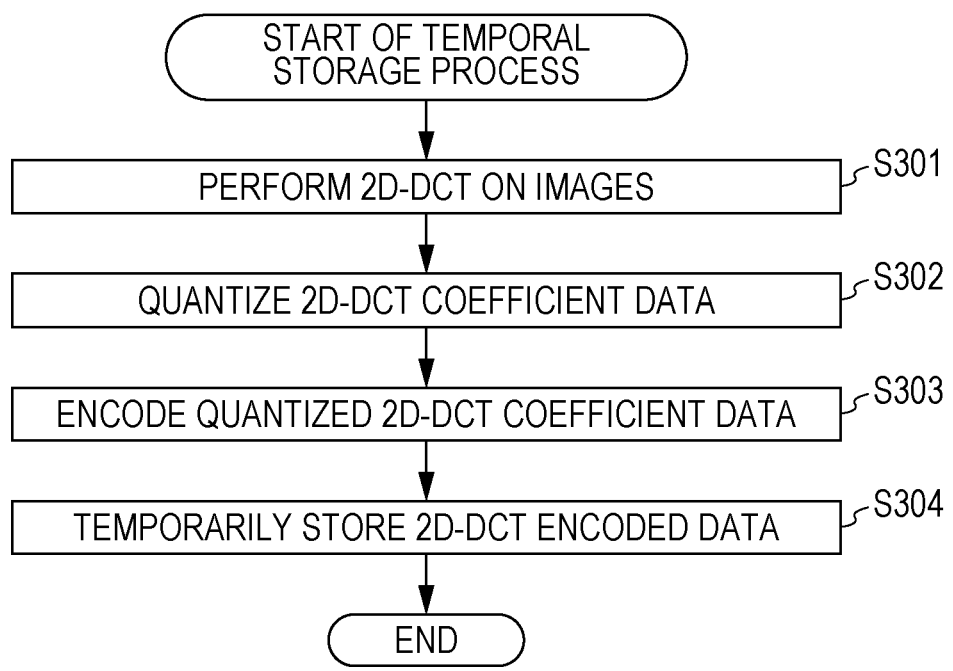
FIG. 25 is a flowchart illustrating a temporal storage process.

Next, processes executed by the devices will be described. First, referring to a flowchart in FIG. 25, an example of a flow of a temporal storage process executed by the JPEG encoder 302 shown in FIG. 23 will be described.

The 2D-DCT unit 321 included in the JPEG encoder 302 performs 2D-DCT for individual blocks on the focus plane images of the Z-stack image supplied from the virtual microscope 101 or the like in step S301. In step S302, the quantization unit 322 quantizes the 2D-DCT coefficient data of the blocks. In step S303, the encoder 323 performs the run-length Huffman encoding on the quantized 2D-DCT coefficient data of the blocks. In step S304, the encoder 323 supplies the generated 2D-DCT encoded data of the blocks to the temporal storage 303 which temporarily stores the 2D-DCT encoded data.

After the process in step S304 is terminated, the temporal storage process is terminated.

Flow of Long-Term Storage Process

Figure 26:
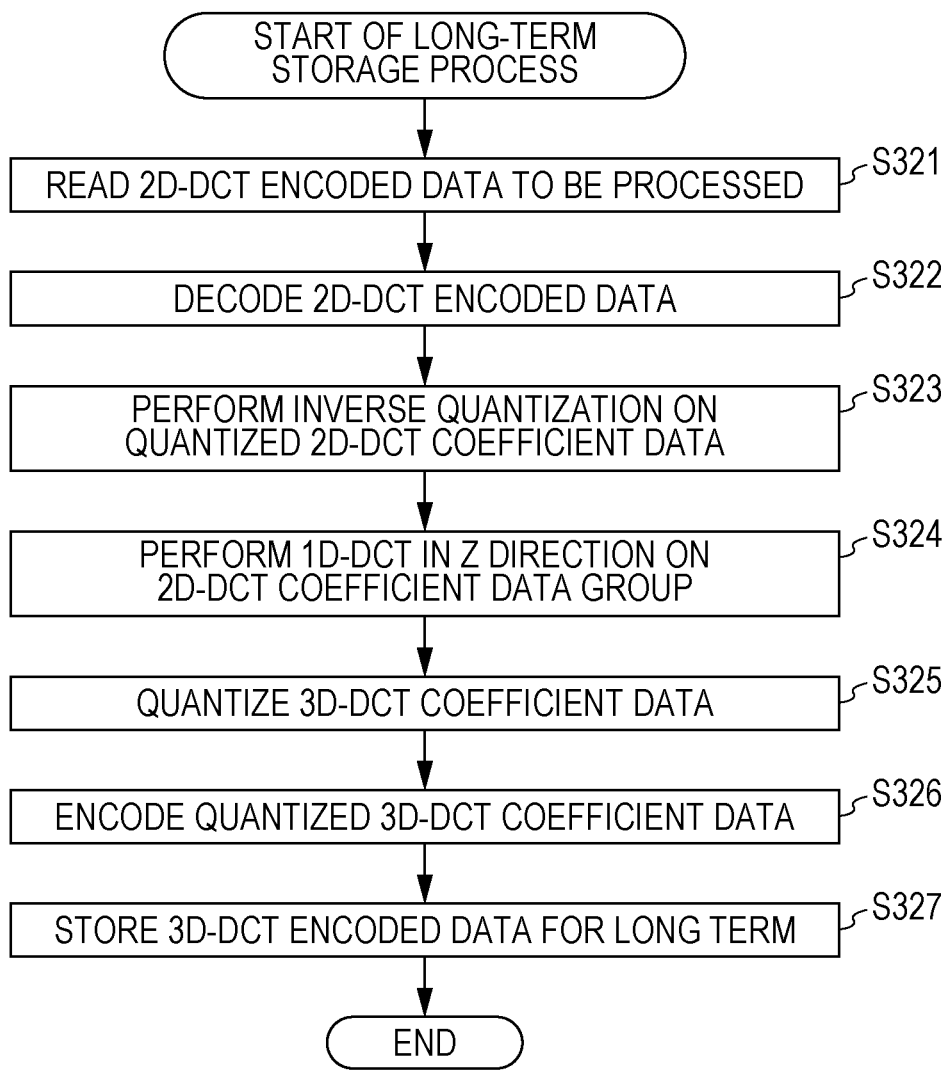
FIG. 26 is a flowchart illustrating a long-term storage process.

Referring now to a flowchart shown in FIG. 26, an example of a flow of a long-term storage process executed by the transcoder 304 will be described.

In step S321, the decoder 341 reads the 2D-DCT encoded data of the blocks from the temporal storage 303. In step S322, the decoder 341 decodes the 2D-DCT encoded data of the blocks.

In step S323, the inverse quantization unit 342 performs inverse quantization on the quantized 2D-DCT efficient data of the blocks.

In step S324, the 1D-DCT unit 343 performs 1D-DCT in the Z direction on 2D-DCT efficient data group of the blocks. In step S325, the quantization unit 344 quantizes 3D-DCT coefficient data of the blocks. In step S326, the encoder 345 encodes the quantized 3D-DCT coefficient data of the blocks.

In step S327, the encoder 345 supplies the generated 3D-DCT encoded data of the blocks to the long-term storage 305 which stores the 3D-DCT encoded data.

After the process in step S327 is terminated, the transcoder 304 terminates the long-term storage process.

By performing the various processes as described above, as with the image processing system 100, the image processing system 300 may reduce capacity used for storage of encoded data obtained by encoding an image while usability of an image is prevented from being deteriorated.

Note that, as with the first embodiment, also in the second embodiment, an encoding method of image data to be supplied to the client terminal apparatus 105 is arbitrarily determined, and image data to be stored in the temporal storage 303 may be encoded by an encoding method other than the JPEG method.

Furthermore, as with the first embodiment, also in the second embodiment, the image data may be subjected to an arbitrary orthogonal transform process such as wavelet transform.

For example, the temporal storage 303 may store image data encoded in the JPEG 2000 method.

Although the case where an image used for cytoscreening or a tissue diagnosis is stored as 3D-DCT encoded data or supplied as JPEG encoded data has been described in the first and second embodiments, content and usage of the image may be arbitrarily determined and an image which is not used as described above may be employed. For example, image representing map information may be employed. Note that images of an image group which is subjected to 3D-DCT and which corresponds to the Z-stack image described above preferably have the high correlations with one another.

Furthermore, although the case where the image data is generated by the virtual microscope 101 has been described, a method for generating image data is arbitrarily determined, and the image data may be generated by a device such as a digital still camera instead of the virtual microscope 101.

Furthermore, in the foregoing embodiments, when quantization is not to be performed, the quantization process and the inverse quantization process described above may be omitted.

Note that, as with the first embodiment, block sizes in an XY plane (focus plane) of the 3D-DCT encoded data to be stored in the long-term storage 305 may be arbitrarily determined and may not be 8×8. An example of a configuration of the transcoder 304 when the block sizes are not determined to be 8×8 will be schematically shown in FIG. 27.

Figure 27:
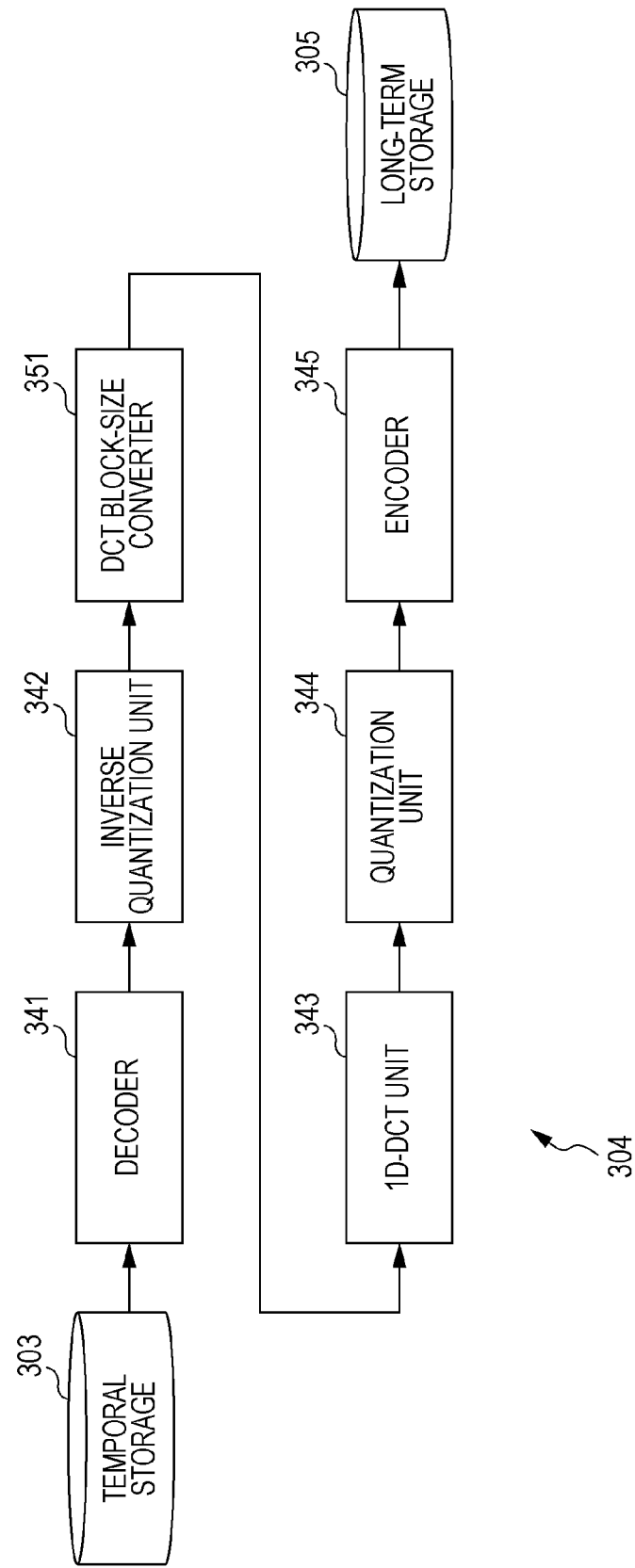
FIG. 27 is a block diagram schematically illustrating another configuration of the transcoder.

The transcoder 304 shown in FIG. 27 includes, in addition to the configuration in the case described with reference to FIG. 24, a DCT block-size converter 351. An output of the inverse quantization unit 342 is supplied to the DCT block-size converter 351. Furthermore, an output of the DCT block-size converter 351 is supplied to the 1D-DCT unit 343.

The DCT block-size converter 351 performs a process the same as those performed by the 2D-IDCT unit 262 and the 2D-DCT unit 263 shown in FIG. 20 and returns the 2D-DCT coefficient data of the blocks to the pixel space so that the block sizes of 8×8 which conform to the JPEG standard are converted into arbitrary block sizes.

Note that, when the converted block sizes are smaller than the block sizes of 8×8, the DCT block-size converter 351 may convert the block sizes of the 2D-DCT coefficient data of the blocks in the frequency space similarly to the DCT block size converter 252.

The DCT block-size converter 351 supplies the 2D-DCT coefficient data obtained after the block-size conversion to the 1D-DCT unit 343. The 1D-DCT unit 343 performs 1D-DCT in the Z direction on the 2D-DCT coefficient data of the blocks and supplies obtained resultant 3D-DCT coefficient data to the quantization unit 344.

Processes performed by the other units are the same as those described with reference to FIG. 24, and therefore, descriptions thereof are omitted.

As described above, the DCT block-size converter 351 may convert the block sizes of the 2D-DCT coefficient data. Accordingly, the transcoder 304 may generate 3D-DCT encoded data having desired block sizes from JPEG encoded data.

Figure 28:
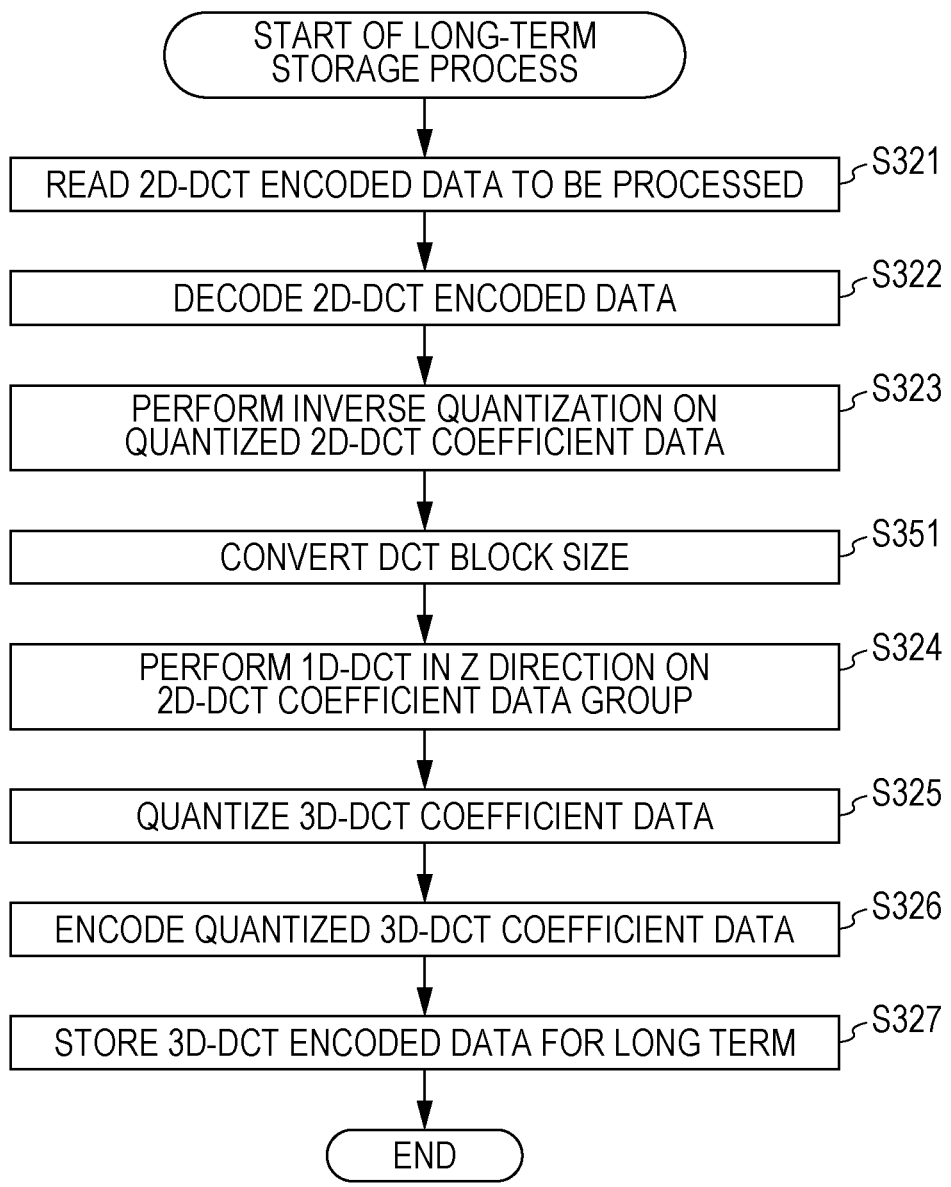
FIG. 28 is a flowchart illustrating another long-term storage process.

FIG. 28 is a flowchart illustrating an example of a flow of a long-term storage process in this case. Also in this case, the flow of the long-term storage process is the basically the same as that described with reference to the flowchart shown in FIG. 26.

Note that, after the process in step S323 is terminated, the process proceeds to step S351.

In step S351, the DCT block-size converter 351 converts block sizes of 8×8 of 2D-DCT coefficient data of blocks obtained through inverse quantization performed in a process of step S323 into desired block sizes. After the block sizes are converted, the DCT block-size converter 351 returns the process to step S324 and the processes in step S324 onwards are executed.

By performing the processes as described above, the transcoder 304 may generate 3D-DCT encoded data having desired block sizes from JPEG encoded data.

It is apparent that block sizes of encoded data stored in the temporal storage 303 may be arbitrarily determined and therefore may be other than 8×8. That is, the encoded data stored in the temporal storage 303 may be encoded in an encoding method other than the JPEG method. Examples of the encoding method include MPEG2, AVC, and HEVC.

Furthermore, a determination as to whether the DCT block-size converter 351 included in the transcoder 304 converts block sizes may be selectively made in accordance with an arbitrary condition where appropriate. Furthermore, the DCT block-size converter 351 may determine block sizes (the DCT block-size converter 351 may arbitrarily set block sizes after conversion).

For example, when high speed of processing has priority, the DCT block-size converter 351 may not convert block sizes (block sizes of 8×8 remain as they are, for example) and supply 2D-DCT coefficient data to the 1D-DCT unit 343 whereas when improvement of encoding efficiency has priority, the DCT block-size converter 351 may change the block sizes (to block sizes of 32×32 or 64×64, for example).

3. Third Embodiment

Personal Computer

A series of the processes described above may be executed by hardware or software. In this case, a personal computer shown in FIG. 29 may be configured, for example.

Figure 29:
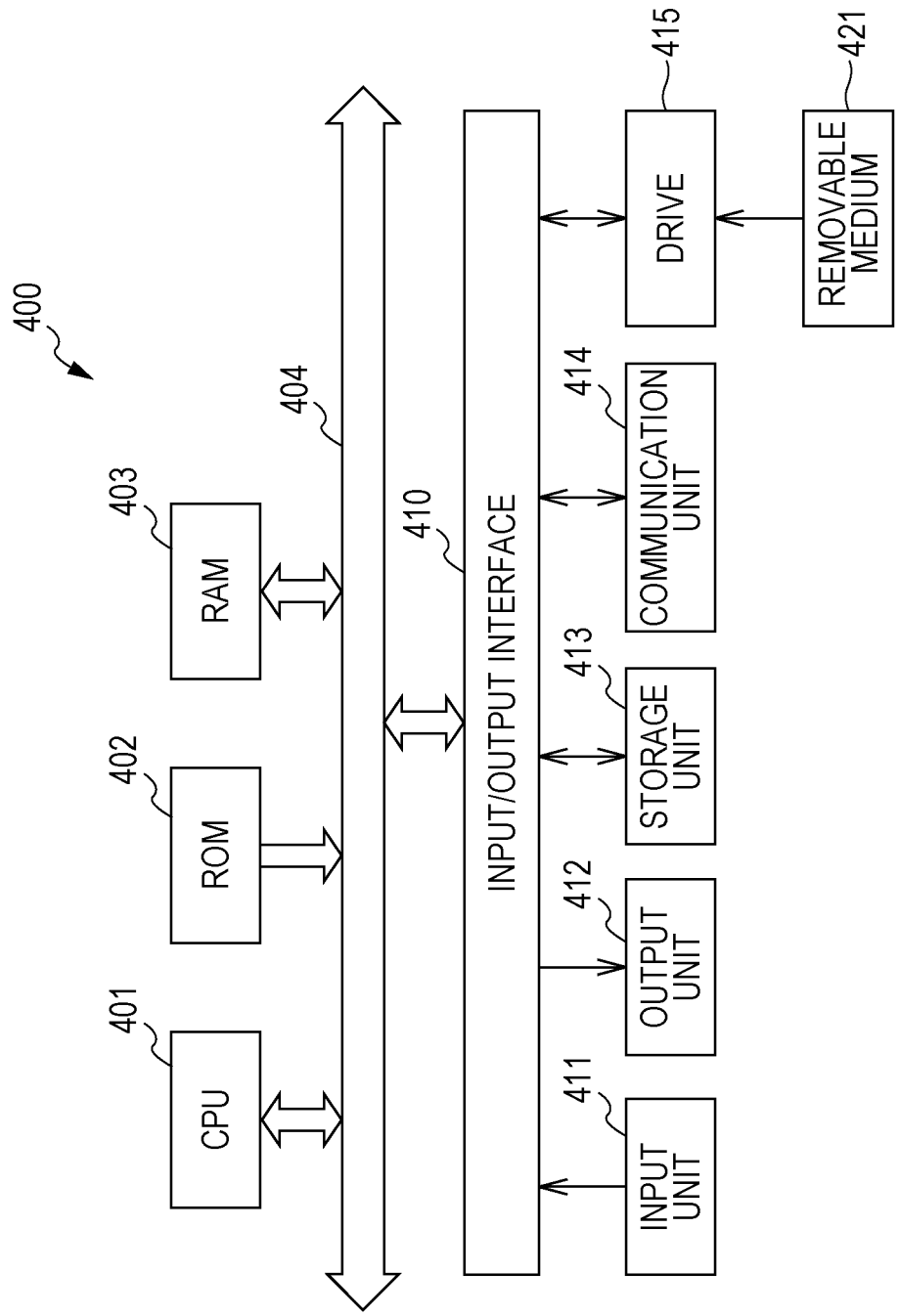
FIG. 29 is a block diagram schematically illustrating a configuration of a personal computer according to a third embodiment of the present disclosure.

In FIG. 29, in a personal computer 400, a CPU (Central Processing Unit) 401 executes various processes in accordance with programs stored in a ROM (Read Only Memory) 402 or programs loaded from a storage unit 413 to a RAM (Random Access Memory) 403. The RAM 403 also appropriately stores data to be used when the CPU 401 execute the various processes.

The CPU 401, the ROM 402, and the RAM 403 are connected to one another through a bus 404. An input/output interface 410 is also connected to the bus 404.

To the input/output interface 410, an input unit 411 including a keyboard and a mouse, an output unit 412 including a display such as a CRT (Cathode Ray Tube) or an LCD (Liquid Crystal Display) and a speaker, the storage unit 413 including a hard disk, and a communication unit 414 including a modem are connected. The communication unit 414 performs a communication process through a network including the Internet.

A drive 415 is also connected to the input/output interface 410, and a removable medium 421 such as a magnetic disk, an optical disc, a magneto-optical disc, or a semiconductor memory is appropriately inserted into the drive 415. Computer programs read from the removable medium 421 are installed in the storage unit 413 where appropriate.

When a series of the processes is to be executed by software, a program constituting the software is installed through the network or from a recording medium.

The recording medium includes the removable medium 421 such as a magnetic disk (including a flexible disk), an optical disc (including a CD-ROM (Compact Disc-Read Only Memory) and a DVD (Digital Versatile Disc)), a magneto-optical disc (including MD (Mini Disc)) and a semiconductor memory which include programs to be distributed to deriver the programs to users and which are provided separately from the apparatus body as shown in FIG. 29 and the ROM 402 and a hard disk included in the storage unit 413 which include programs recorded therein which are delivered to the users in a state in which the ROM 402 and the hard disk are incorporated in the apparatus body in advance.

Note that programs may be executed by the computer in a time-series manner in an order described herein, may be executed in parallel, or may be executed where appropriate when the programs are called, for example.

Furthermore, in this specification, a step of describing a program recorded in the recording medium includes processes performed in the time-series manner in the order described herein, processes performed in parallel, and processes executed separately from one another.

Furthermore, in this specification, the term "system" represents an entire apparatus including a plurality of devices (units).

Furthermore, a configuration described as a single device (or processing unit) in the foregoing description may be divided into a plurality of devices (or processing units). Conversely, a configuration including a plurality of devices (or processing units) in the foregoing description may be collectively configured as a single device (or processing unit). Furthermore, other configurations may be added to the configurations of the devices (or processing units). Furthermore, part of the configuration of one of the devices (or one of the processing units) may be included in a configuration of one of the other devices (or one of the other processing units) as long as the configuration and operation of the entire system are substantially not changed. That is, the embodiments of the present disclosure are not limited to the foregoing embodiments and various modifications may be made without departing from the scope of the present disclosure.

The present disclosure contains subject matter related to that disclosed in Japanese Priority Patent Application JP 2010-198118 filed in the Japan Patent Office on Sep. 3, 2010 and Japanese Priority Patent Application JP 2011-014940 filed in the Japan Patent Office on Jan. 27, 2011, the entire contents of which are hereby incorporated by reference.

What is claimed is:

1. An image processing apparatus comprising:
    a two-dimensional orthogonal transform unit configured to perform two-dimensional orthogonal transform on a plurality of images;
    a one-dimensional orthogonal transform unit configured to perform a one-dimensional orthogonal transform in a focus direction of the images, the images being arranged using two-dimensional orthogonal transform coefficient data obtained by performing the two-dimensional orthogonal transform on the images using the two-dimensional orthogonal transform unit; and
    a three-dimensional orthogonal transform coefficient data encoder configured to encode three-dimensional orthogonal transform coefficient data obtained by performing the one-dimensional orthogonal transform on the two-dimensional orthogonal transform coefficient data using the one-dimensional orthogonal transform unit.

2. The image processing apparatus according to claim 1, wherein the images have the high correlations with one another.

3. The image processing apparatus according to claim 1, further comprising:
    an image analysis unit configured to analyze the images; and
    a block-size determination unit configured to determine block sizes, each of which serves as a unit of a process performed by the two-dimensional orthogonal transform unit, in accordance with a result of the analysis performed by the image analysis unit.

4. The image processing apparatus according to claim 1, further comprising:
    an image analysis unit configured to analyze the images;
    a quantization parameter setting unit configured to set quantization parameters used to quantize the three-dimensional orthogonal transform coefficient data in accordance with a result of the analysis performed by the image analysis unit; and
    a quantization unit configured to quantize the three-dimensional orthogonal transform coefficient data using the quantization parameters set by the quantization parameter setting unit,
    wherein the three-dimensional orthogonal transform coefficient data encoder encodes the three-dimensional orthogonal transform coefficient data which has been quantized by the quantization unit.

5. The image processing apparatus according to claim 1, further comprising:
    a correlation analysis unit configured to analyze the correlations among the images; and
    a low-correlation image deletion unit configured to delete images which have the low correlations with the other images among the plurality of images in accordance with a result of the analysis performed by the correlation analysis unit.

6. The image processing apparatus according to claim 1, further comprising:
    a focus determination unit configured to determine whether the individual images are focused; and
    a focus flag setting unit configured to set focus flags representing whether the individual images are focused in accordance with a result of the determination performed by the focus determination unit.

7. The image processing apparatus according to claim 1, further comprising:
    a storage unit configured to store three-dimensional orthogonal transform encoded data obtained by encoding the three-dimensional orthogonal transform coefficient data using the three-dimensional orthogonal transform coefficient data encoder.

8. The image processing apparatus according to claim 7, further comprising:
    a reading unit configured to read the three-dimensional orthogonal transform encoded data stored in the storage unit; and
    a transform unit configured to transform the three-dimensional orthogonal transform encoded data read from the storage unit using the reading unit into two-dimensional orthogonal transform encoded data which is obtained by encoding the two-dimensional orthogonal transform coefficient data.

9. The image processing apparatus according to claim 8, wherein the transform unit includes
    a decoder configured to decode the three-dimensional orthogonal transform encoded data by a decoding method corresponding to an encoding method for the three-dimensional orthogonal transform coefficient data encoder,
    an one-dimensional inverse orthogonal transform unit configured to perform one-dimensional inverse orthogonal transform in a direction in which the images are arranged on the three-dimensional orthogonal transform coefficient data obtained by decoding the three-dimensional orthogonal transform encoded data using the encoder, and
    a two-dimensional orthogonal transform coefficient data encoder configured to encode the two-dimensional orthogonal transform coefficient data obtained by performing the inverse orthogonal transform on the three-dimensional orthogonal transform coefficient data using the one-dimensional inverse orthogonal transform unit.

10. The image processing apparatus according to claim 9, wherein the transform unit further includes an extraction unit configured to extract two-dimensional orthogonal transform coefficient data including a desired image from among a plurality of the two-dimensional orthogonal transform coefficient data obtained by performing the inverse orthogonal transform on the three-dimensional orthogonal transform coefficient data using the one-dimensional inverse orthogonal transform unit, and
    the two-dimensional orthogonal transform coefficient data encoder encodes the two-dimensional orthogonal transform coefficient data extracted by the extraction unit.

11. The image processing apparatus according to claim 10, further comprising:
    a block-size conversion unit configured to convert block sizes, each of which serves as a unit of the two-dimensional orthogonal transform process, of the two-dimensional orthogonal transform coefficient data extracted by the extraction unit,
    wherein the two-dimensional orthogonal transform coefficient data encoder encodes the two-dimensional orthogonal transform coefficient data obtained through the block-size conversion performed by the block-size conversion unit.

12. The image processing apparatus according to claim 11, wherein the block-size conversion unit obtains the two-dimensional orthogonal transform coefficient data which has been subjected to the block size conversion by converting the block sizes in a frequency space.

13. The image processing apparatus according to claim 11, wherein the block-size conversion unit converts sizes of the blocks after the two-dimensional orthogonal transform coefficient data is subjected to two-dimensional orthogonal transform so that baseband image data is obtained, and obtains the two-dimensional orthogonal transform coefficient data which has been subjected to the block size conversion by performing two-dimensional orthogonal transform on the obtained baseband image data which has been subjected to the block size conversion.

14. The image processing apparatus according to claim 8 further comprising:
a request reception unit configured to receive a request for a desired image; and
a supplying unit configured to supply two-dimensional orthogonal transform encoded data which includes the image specified by the request received by the request reception unit and which is obtained through the transform performed by the transform unit to a source of the request of the image,
wherein the reading unit reads three-dimensional orthogonal transform encoded data including the image specified by the request received by the request reception unit from the storage unit, and
the transform unit transforms the three-dimensional orthogonal transform encoded data read from the storage unit using the reading unit into the two-dimensional orthogonal transform encoded data including the image specified by the request received by the request reception unit.

15. The image processing apparatus according to claim 14, further comprising:
a transmission information obtaining unit configured to obtain transmission information regarding transmission of the two-dimensional orthogonal transform encoded data from the supplying unit; and
an encoding parameter controller configured to control encoding parameters of the transform unit in accordance with the transmission information obtained by the transmission information obtaining unit.

16. An image processing method of an image processing apparatus comprising:
performing two-dimensional orthogonal transform on a plurality of images;
performing a one-dimensional orthogonal transform in a focus direction of the images, the images being arranged using two-dimensional orthogonal transform coefficient data obtained by performing the two-dimensional orthogonal transform on the images; and
encoding three-dimensional orthogonal transform coefficient data obtained by performing the one-dimensional orthogonal transform on the two-dimensional orthogonal transform coefficient data.

17. An image processing apparatus comprising:
a decoder configured to individually decode a plurality of two-dimensional orthogonal transform encoded data obtained by performing two-dimensional orthogonal transform on a plurality of images;
an one-dimensional orthogonal transform unit configured to perform one-dimensional orthogonal transform in a focus direction of the images, the images being arranged using a plurality of two-dimensional orthogonal transform coefficient data obtained by decoding the plurality of two-dimensional orthogonal transform encoded data using the decoder; and
a three-dimensional orthogonal transform coefficient data encoder configured to encode three-dimensional orthogonal transform coefficient data obtained by performing one-dimensional orthogonal transform on the two-dimensional orthogonal transform coefficient data using the one-dimensional orthogonal transform unit.

18. The image processing apparatus according to claim 17, further comprising:
a temporal storage unit configured to store the two-dimensional orthogonal transform encoded data for a comparatively short term; and
a long-term storage unit configured to store three-dimensional orthogonal transform encoded data obtained by encoding the three-dimensional orthogonal transform coefficient data using the three-dimensional orthogonal transform coefficient data encoder for a comparatively long term,
wherein the decoder individually reads and decodes the plurality of two-dimensional orthogonal transform encoded data stored in the temporal storage unit.

19. The image processing apparatus according to claim 18, further comprising:
a two-dimensional orthogonal transform unit configured to perform two-dimensional orthogonal transform on a plurality of images; and
a two-dimensional orthogonal transform coefficient data encoder configured to encode a plurality of two-dimensional orthogonal transform coefficient data obtained by performing the two-dimensional orthogonal transform on the images using the two-dimensional orthogonal transform unit,
wherein the temporal storage unit stores the two-dimensional orthogonal transform encoded data obtained by individually encoding the two-dimensional orthogonal transform coefficient data using the two-dimensional orthogonal transform coefficient data encoder for a comparatively short term.

20. An image processing method of an image processing apparatus comprising:
individually decoding a plurality of two-dimensional orthogonal transform encoded data obtained by performing two-dimensional orthogonal transform on a plurality of images;
performing a one-dimensional orthogonal transform in a focus direction of the images, the images being arranged using a plurality of two-dimensional orthogonal transform coefficient data obtained by decoding the plurality of two-dimensional orthogonal transform encoded data; and
encoding three-dimensional orthogonal transform coefficient data obtained by performing one-dimensional orthogonal transform on the two-dimensional orthogonal transform coefficient data.

* * * * *